United States Patent
Li et al.

(10) Patent No.: US 12,349,110 B2
(45) Date of Patent: Jul. 1, 2025

(54) METHOD AND APPARATUS OF HANDLING PERIODIC SIDELINK RESOURCES AND DISCONTINUOUS RECEPTION FOR SIDELINK COMMUNICATION IN A WIRELESS COMMUNICATION SYSTEM

(71) Applicant: ASUSTek Computer Inc., Taipei (TW)

(72) Inventors: Ming-Che Li, Taipei (TW); Li-Chih Tseng, Taipei (TW); Yi-Hsuan Kung, Taipei (TW); Chun-Wei Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 275 days.

(21) Appl. No.: 17/698,441

(22) Filed: Mar. 18, 2022

(65) Prior Publication Data

US 2022/0312389 A1    Sep. 29, 2022

Related U.S. Application Data

(60) Provisional application No. 63/163,576, filed on Mar. 19, 2021.

(51) Int. Cl.
*H04W 72/02* (2009.01)
*H04W 28/26* (2009.01)
(Continued)

(52) U.S. Cl.
CPC .......... *H04W 72/02* (2013.01); *H04W 28/26* (2013.01); *H04W 72/23* (2023.01); *H04W 72/56* (2023.01); *H04W 76/28* (2018.02)

(58) Field of Classification Search
None
See application file for complete search history.

(56) References Cited

U.S. PATENT DOCUMENTS

| | | | |
|---|---|---|---|
| 2021/0227465 A1 | 7/2021 | Kung et al. | |
| 2023/0239793 A1* | 7/2023 | Lin | H04W 52/0216 |
| | | | 370/311 |

(Continued)

FOREIGN PATENT DOCUMENTS

| | | |
|---|---|---|
| CN | 110521264 A | 11/2019 |
| CN | 111726871 A | 9/2020 |

(Continued)

OTHER PUBLICATIONS (Author Unknown, Definition of the Active Time in SL DRX, pp. 1-4, (Jan. 2021).*
Author Unknown, Summary of email discussion [702][SLe] High-level principles for SL DRX, pp. 1-85, (Jan. 2021).*
(Continued)

*Primary Examiner* — Christopher M Crutchfield
(74) *Attorney, Agent, or Firm* — Cooper Legal Group LLC

(57) ABSTRACT

A method and apparatus are disclosed from the perspective of a first device to perform sidelink communication. In one embodiment, the first device has a periodic sidelink resource reservation, wherein the periodic sidelink resource reservation comprises, reserves, or provides one set of sidelink resources in one period. The first device also has one or more sidelink logical channels with available sidelink data, wherein the one or more sidelink logical channels are associated with one or more destinations. Furthermore, the first device selects or determines a first destination, among the one or more destinations, satisfying at least a condition that an initial sidelink resource of the one set of sidelink resources is within sidelink active time associated with the first destination. In addition, the first device generates a first data packet for the first destination. Also, the first device performs one or more sidelink transmissions on the one set of sidelink resources to the first destination, wherein the one (Continued)

or more sidelink transmissions includes, delivers, or comprises the first data packet.

20 Claims, 13 Drawing Sheets

(51) Int. Cl.
*H04W 72/23* (2023.01)
*H04W 72/56* (2023.01)
*H04W 76/28* (2018.01)

(56) References Cited

U.S. PATENT DOCUMENTS

| | | | |
|---|---|---|---|
| 2023/0345575 A1* | 10/2023 | Ko | H04W 76/28 |
| 2023/0363048 A1* | 11/2023 | Park | H04W 4/40 |
| 2023/0371005 A1* | 11/2023 | Cai | H04W 72/02 |
| 2024/0022356 A1* | 1/2024 | Lee | H04L 1/1896 |
| 2024/0057212 A1* | 2/2024 | Zhang | H04W 76/28 |

FOREIGN PATENT DOCUMENTS

| | | |
|---|---|---|
| CN | 112074017 A | 12/2020 |
| CN | 112312526 A | 2/2021 |
| WO | 2021139521 | 7/2021 |

OTHER PUBLICATIONS

Author Unknown, Alignment of Wake-up Time between TX and RX UEs, pp. 1-17, (Feb. 5, 2021).*
Author Unknown, Alignment of wake-up time between TX and RX UEs, Doc. No. R2-2101331, pp. 1-2, (Feb. 5, 2021).*
InterDigital, "Summary of [POST113-e][703][V2X/SL] Details of Timer (InterDigital)", Agenda 8.15.2, R2-210xxxx, Discussion, Decision, 3GPP TSG-RAN WG2 Meeting #113-bis-e, Electronic Meeting, Apr. 12-20, 2021.
LG Electronics Inc.: "Discussion on Sidelink DRX", R2-2008943, 3GPP TSG RAN WG2 #112-E, Nov. 2-Nov. 13, 2020, 6 pages.
LG Electronics: "Discussion on physical layer design considering sidelink DRX operation", R1-2007897, 3GPP TSG RAN WG1 #103-E E-Meeting, Oct. 26-Nov. 13, 2020, 15 pages.
Vivo: "Resource allocation for sidelink power saving", R1-2101790, 3GPP TSG RAN WG1 #104-E, e-Meeting, Jan. 25-Feb. 5, 2021, 17 pages.
Corresponding Korean Patent Application No. 10-2022-0033992, Notice of Submission of Opinion dated Sep. 11, 2024, English Translation, 28 pages.
LG Electronics: "Discussion on Physical Layer Design Considering Sidelink DRX Operation", 3GPP TSG RAN WG1 #103-e, R1-2007897, E-Meeting, Oct. 26-Nov. 13, 2020, 15 pgs.
LG Electronics Inc.: "Discussion on Sidelink Drx"; 3GPP TSG-RAN WG2 Meeting #112, electronic, R2-2008943, Online, Nov 2-Nov. 13, 2020, 7 pages.
Corresponding Chinese Patent Application No. 10-2022-10270980. 1, Office Action dated Feb. 21, 2025, English Translation, 28 pages.

* cited by examiner

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| ... | ... |
| 3_0 | Scheduling of NR sidelink in one cell |
| 3_1 | Scheduling of LTE sidelink in one cell |

FIG. 5 (PRIOR ART)

| Value of 2nd-stage SCI format field | 2nd-stage SCI format |
|---|---|
| 00 | SCI format 2-A |
| 01 | SCI format 2-B |
| 10 | Reserved |
| 11 | Reserved |

FIG. 6 (PRIOR ART)

| Value of Beta_offset indicator | Beta_offset index in Table 9.3-2 of [5, TS38.213] |
|---|---|
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

FIG. 7 (PRIOR ART)

| Value of the Number of DMRS port field | Antenna ports |
|---|---|
| 0 | 1000 |
| 1 | 1000 and 1001 |

FIG. 8 (PRIOR ART)

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

FIG. 9 (PRIOR ART)

METHOD AND APPARATUS OF HANDLING PERIODIC SIDELINK RESOURCES AND DISCONTINUOUS RECEPTION FOR SIDELINK COMMUNICATION IN A WIRELESS COMMUNICATION SYSTEM

CROSS-REFERENCE TO RELATED APPLICATIONS

The present application claims the benefit of U.S. Provisional Patent Application Ser. No. 63/163,576 filed on Mar. 19, 2021, the entire disclosure of which is incorporated herein in their entirety by reference.

FIELD

This disclosure generally relates to wireless communication networks, and more particularly, to a method and apparatus of handling periodic sidelink resources and discontinuous reception for sidelink communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first device to perform sidelink communication. In one embodiment, the first device has a periodic sidelink resource reservation, wherein the periodic sidelink resource reservation comprises, reserves, or provides one set of sidelink resources in one period. The first device also has one or more sidelink logical channels with available sidelink data, wherein the one or more sidelink logical channels are associated with one or more destinations. Furthermore, the first device selects or determines a first destination, among the one or more destinations, satisfying at least a condition that an initial sidelink resource of the one set of sidelink resources is within sidelink active time associated with the first destination. In addition, the first device generates a first data packet for the first destination. Also, the first device performs one or more sidelink transmissions on the one set of sidelink resources to the first destination, wherein the one or more sidelink transmissions includes, delivers, or comprises the first data packet.

BRIEF DESCRIPTION OF THE DRAWINGS

FIG. 5 is a reproduction of Table 7.3.1-1 of 3GPP TS 38.212 V16.4.0.

FIG. 6 is a reproduction of Table 8.3.1.1-1 of 3GPP TS 38.212 V16.4.0.

FIG. 7 is a reproduction of Table 8.3.1.1-2 of 3GPP TS 38.212 V16.4.0.

FIG. 8 is a reproduction of Table 8.3.1.1-3 of 3GPP TS 38.212 V16.4.0.

FIG. 9 is a reproduction of Table 8.4.1.1-1 of 3GPP TS 38.212 V16.4.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.213 V16.4.0 (2020 December), "E-UTRA Physical layer procedures (Release 16)"; TS 38.214 V16.4.0 (2020 December), "NR; Physical layer procedures for data (Release 16)"; TS 38.213 V16.4.0 (2020 December), "NR; Physical layer procedures for control (Release 16)"; TS 38.212 V16.4.0 (2020 December), "NR; Multiplexing and channel coding (Release 16)"; TS 38.321 V16.3.0 (2020 December), "NR; Medium Access Control (MAC) protocol specification (Release 16)"; TS 38.331 V16.3.0 (2020 December), "NR; Radio Resource Control (RRC) protocol specification (Release 16)"; RP-202846, "WID revision: NR sidelink enhancement", LG Electronics; Final Report of 3GPP TSG RAN WG1 #103-e V1.0.0 (Online meeting, 26 Oct.-13 Nov. 2020); Draft Report of 3GPP TSG RAN WG1 #104-e V0.3.0 (Online meeting, 25 Jan.-5 Feb. 2021); R2-2100001, "Report of 3GPP TSG RAN2 #112-e meeting, Online"; and R1-2009460, "LS reply on SL CG handling". The standards and documents listed above are hereby expressly incorporated by reference in their entirety.

Figure 1:
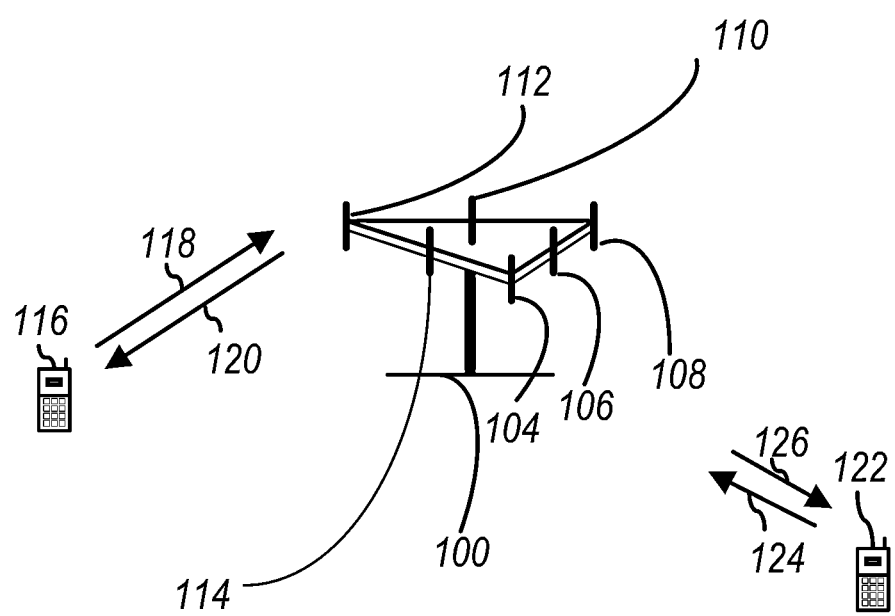
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
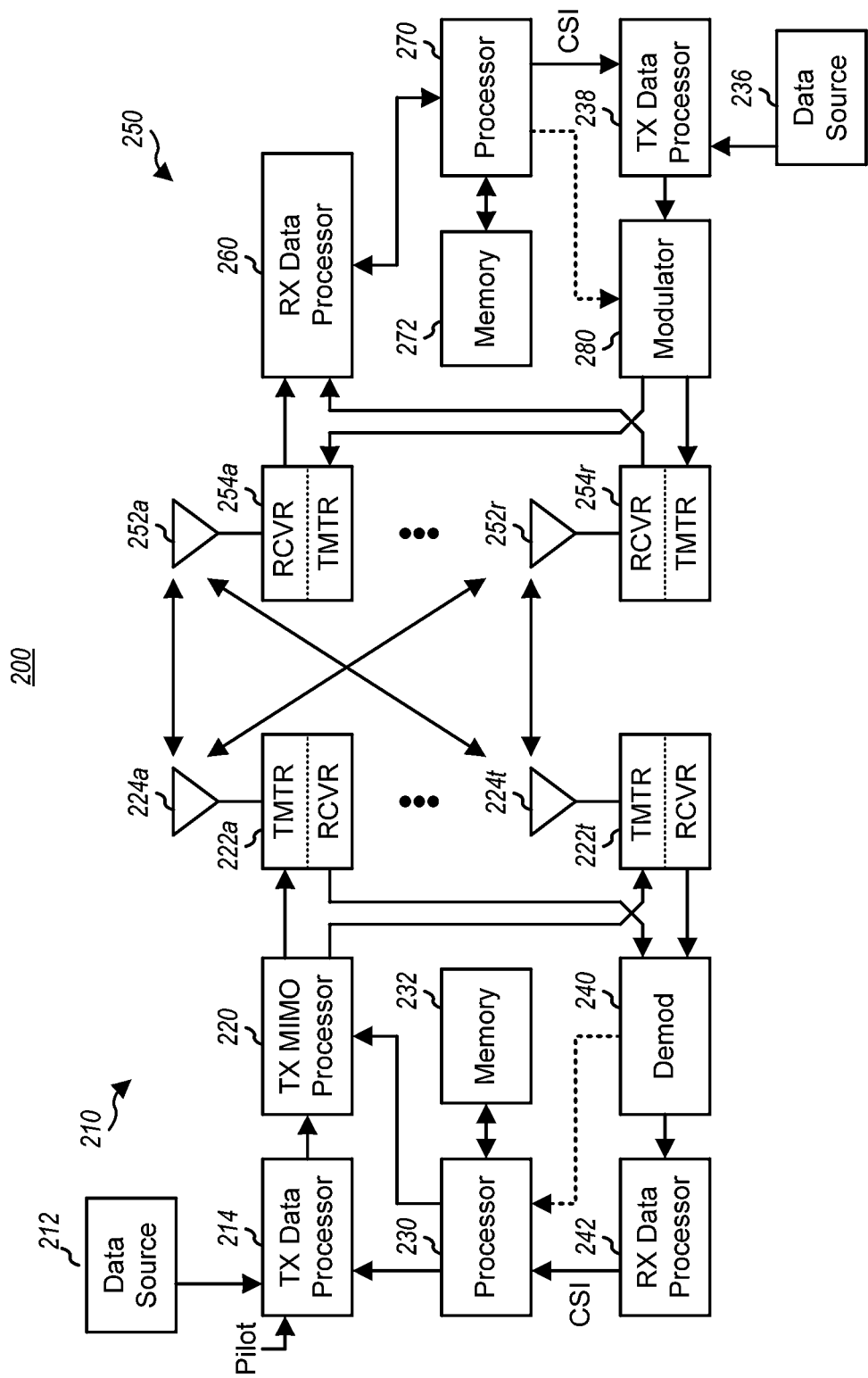
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
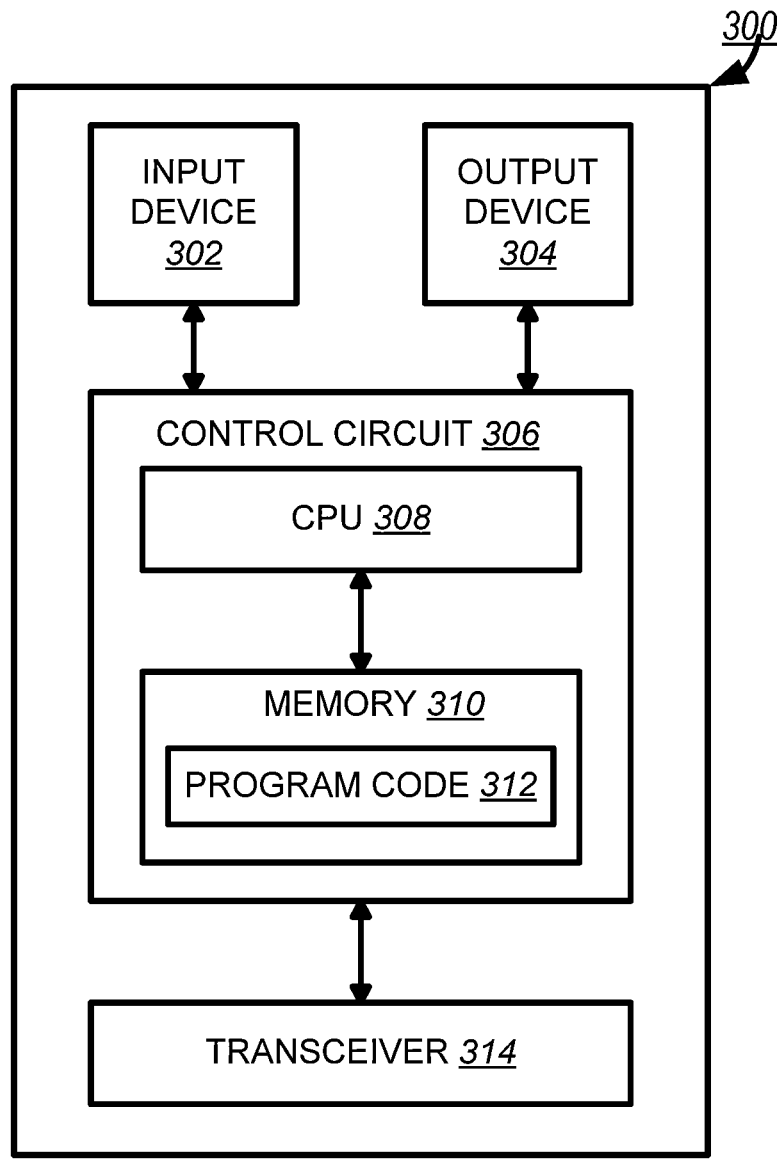
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
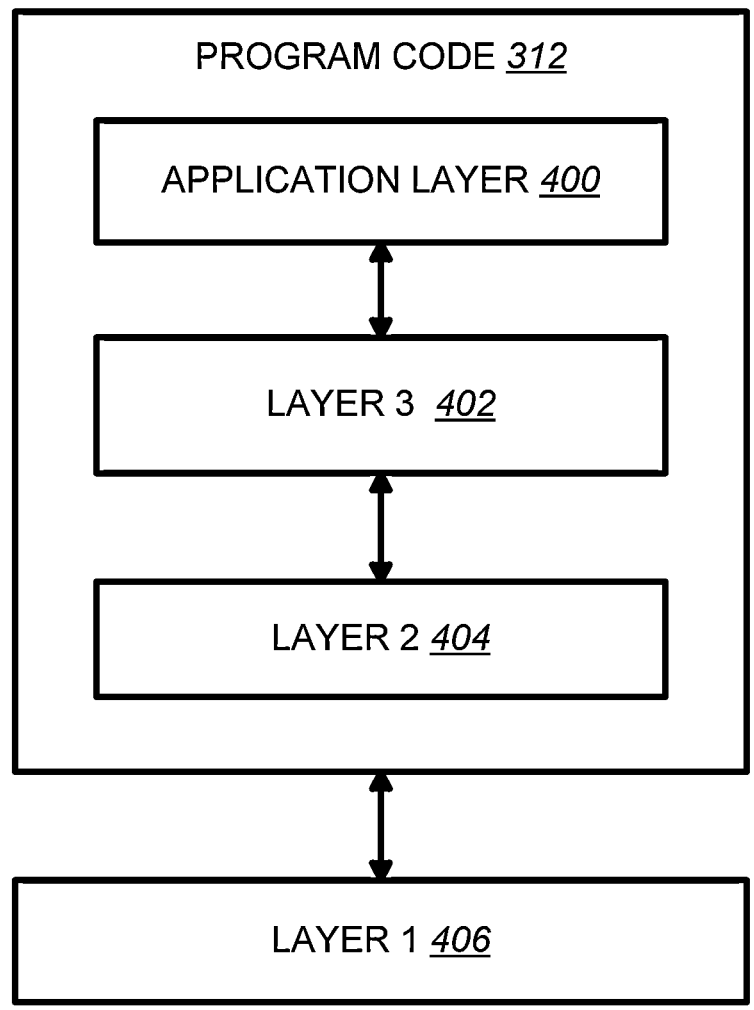
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.214 specifies Physical Sidelink Shared Channel related procedure in NR as shown below. For acquiring sidelink resources, 3GPP TS 38.214 specifies sidelink resource allocation mode 1 and sidelink resource allocation mode 2 as shown below.

8 Physical Sidelink Shared Channel Related Procedures
A UE can be configured by higher layers with one or more sidelink resource pools. A sidelink resource pool can be for transmission of PSSCH, as described in Clause 8.1, or for reception of PSSCH, as described in Clause 8.3 and can be associated with either sidelink resource allocation mode 1 or sidelink resource allocation mode 2.
In the frequency domain, a sidelink resource pool consists of sl-NumSubchannel contiguous sub-channels. A sub-channel consists of sl-SubchannelSize contiguous PRBs, where sl-NumSubchannel and sl-SubchannelSize are higher layer parameters.
[ . . . ]
The UE determines the set of slots assigned to a sidelink resource pool as follows:
  a bitmap $(b_0, b_1, \ldots, b_{L_{bitmap}-1})$ associated with the resource pool is used where $L_{bitmap}$ the length of the bitmap is configured by higher layers.
  a slot $t_k^{SL}$ $(0 \leq k < 10240 \times 2^\mu - N_{S_{SSB}} - N_{nonSL} - N_{reserved})$ belongs to the set if $b_{k'}=1$ where $k'=k \bmod L_{bitmap}$.
  The slots in the set are re-indexed such that the subscripts i of the remaining slots $t'_i^{SL}$ are successive $\{0, 1, \ldots, T'_{max}-1\}$ where $T'_{max}$ is the number of the slots remaining in the set.
The UE determines the set of resource blocks assigned to a sidelink resource pool as follows:
  The resource block pool consists of $N_{PRB}$ PRBs.
  The sub-channel m for m=0, 1, . . . , numSubchannel−1 consists of a set of $n_{subCHsize}$ contiguous resource blocks with the physical resource block number $n_{PRB}=n_{subCHRBstart}+m \cdot n_{subCHsize}+j$ for j=0, 1, . . . , $n_{subCHsize}-1$, where $n_{subCHRBstart}$ and $n_{subCHsize}$ are given by higher layer parameters sl-StartRB-Subchannel and sl-SubchannelSize, respectively
[ . . . ]
8.1 UE Procedure for Transmitting the Physical Sidelink Shared Channel
Each PSSCH transmission is associated with an PSCCH transmission.
That PSCCH transmission carries the 1$^{st}$ stage of the SCI associated with the PSSCH transmission; the 2$^{nd}$ stage of the associated SCI is carried within the resource of the PSSCH.
If the UE transmits SCI format 1-A on PSCCH according to a PSCCH resource configuration in slot n and PSCCH resource m, then for the associated PSSCH transmission in the same slot
[ . . . ]
8.1.2 Resource Allocation
In sidelink resource allocation mode 1:
  for PSSCH and PSCCH transmission, dynamic grant, configured grant type 1 and configured grant type 2 are supported. The configured grant Type 2 sidelink transmission is semi-persistently scheduled by a SL grant in a valid activation DCI according to Clause 10.3 of [6, TS 38.213].
8.1.2.1 Resource Allocation in Time Domain
The UE shall transmit the PSSCH in the same slot as the associated PSCCH.
The minimum resource allocation unit in the time domain is a slot.
[ . . . ]
In sidelink resource allocation mode 1:
  For sidelink dynamic grant, the PSSCH transmission is scheduled by a DCI format 3_0.
  For sidelink configured grant type 2, the configured grant is activated by a DCI format 3_0.
  For sidelink dynamic grant and sidelink configured grant type 2:
    The "Time gap" field value m of the DCI format 3_0 provides an index m+1 into a slot offset table. That table is given by higher layer parameter timeGap-FirstSidelinkTransmission and the table value at index m+1 will be referred to as slot offset $K_{SL}$.
    The slot of the first sidelink transmission scheduled by the DCI is the first SL slot of the corresponding resource pool that starts not earlier than $$T_{DL} - \frac{T_{TA}}{2} + K_{SL} \times T_{slot}$$

where $T_{DL}$ is starting time of the downlink slot carrying the corresponding DCI, $T_{TA}$ is the timing advance value corresponding to the TAG of the serving cell on which the DCI is received and $K_{SL}$ is the slot offset between the slot DCI and the first sidelink transmission scheduled by DCI and $T_{slot}$ is the SL slot duration.
  For sidelink configured grant type 1:
    The slot of the first sidelink transmissions follows the higher layer configuration according to [10, TS 38.321].
[ . . . ]
8.1.4 UE Procedure for Determining the Subset of Resources to be Reported to Higher Layers in PSSCH Resource Selection in Sidelink Resource Allocation Mode 2
In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:
  the resource pool from which the resources are to be reported;
  L1 priority, $prio_{TX}$;
  the remaining packet delay budget;
  the number of sub-channels to be used for the PSSCH/PSCCH transmission in a slot, $L_{subCH}$;

optionally, the resource reservation interval, $P_{rsvp\_TX}$, in units of msec.
[ . . . ]

8.1.5 UE Procedure for Determining Slots and Resource Blocks for PSSCH Transmission Associated with an SCI Format 1-A The set of slots and resource blocks for PSSCH transmission is determined by the resource used for the PSCCH transmission containing the associated SCI format 1-A, and fields 'Frequency resource assignment', 'Time resource assignment' of the associated SCI format 1-A as described below. 'Time resource assignment' carries logical slot offset indication of N=1 or 2 actual resources when sl-MaxNumPerReserve is 2, and N=1 or 2 or 3 actual resources when sl_MaxNumPerReserve is 3, in a form of time RIV (TRIV) field which is determined as follows:

```
if N = 1
    TRIV = 0
elseif N = 2
    TRIV = t₁
else
    if (t₂ – t₁ – 1) ≤ 15
        TRIV = 30(t₂ – t₁ – 1) + t₁ + 31
    else
        TRIV = 30(31 – t₂ + t₁) + 62 – t₁
    end if
end if
``` where the first resource is in the slot where SCI format 1-A was received, and $t_i$ denotes i-th resource time offset in logical slots of a resource pool with respect to the first resource where for N=2, 1≤$t_1$≤31; and for N=3, 1≤$t_1$≤30, $t_1$<$t_2$≤31.

3GPP TS 38.213 specifies sidelink control and feedback channel related procedure in NR as follows:

16 UE Procedures for Sidelink

A UE is provided by SL-BWP-Config a BWP for SL transmissions (SL BWP) with numerology and resource grid determined as described in [4, TS 38.211]. For a resource pool within the SL BWP, the UE is provided by sl-NumSubchannel a number of sub-channels where each sub-channel includes a number of contiguous RBs provided by sl-SubchannelSize. The first RB of the first sub-channel in the SL BWP is indicated by sl-StartRB-Subchannel. Available slots for a resource pool are provided by timeresourcepool and occur with a periodicity of 10240 ms. For an available slot without S-SS/PSBCH blocks, SL transmissions can start from a first symbol indicated by sl-StartSymbol and be within a number of consecutive symbols indicated by sl-LengthSymbols.

[ . . . ]

16.4 UE Procedure for Transmitting PSCCH

A UE can be provided a number of symbols in a resource pool, by sl-TimeResourcePSCCH, starting from a second symbol that is available for SL transmissions in a slot, and a number of PRBs in the resource pool, by sl-FreqResourcePSCCH, starting from the lowest PRB of the lowest sub-channel of the associated PSSCH, for a PSCCH transmission with a SCI format 1-A.

3GPP TS 38.212 specifies sidelink control information and Downlink Control Information (DCI) as Sidelink (SL) grant in NR as follows:

7.3.1 DCI Formats

The DCI formats defined in table 7.3.1-1 are supported.

[Table 7.3.1-1 of 3GPP TS 38.212 V16.4.0, entitled "DCI formats", is reproduced as FIG. 5]

[ . . . ]

7.3.1.4 DCI Formats for Scheduling of Sidelink 7.3.1.4.1 Format 3_0

DCI format 3_0 is used for scheduling of NR PSCCH and NR PSSCH in one cell.

The following information is transmitted by means of the DCI format 3_0 with CRC scrambled by SL-RNTI or SL-CS-RNTI:

Resource pool index—$\lceil \log_2 I \rceil$ bits, where I is the number of resource pools for transmission configured by the higher layer parameter sl-TxPoolScheduling.

Time gap—3 bits determined by higher layer parameter sl-DCI-ToSL-Trans, as defined in clause 8.1.2.1 of [6, TS 38.214]

HARQ process number—4 bits as defined in clause 16.4 of [5, TS 38.213]

New data indicator—1 bit as defined in clause 16.4 of [5, TS 38.213]

Lowest index of the subchannel allocation to the initial transmission—$\lceil \log_2(N_{subChannel}^{SL}) \rceil$ bits as defined in clause 8.1.2.2 of [6, TS 38.214]

SCI format 1-A fields according to clause 8.3.1.1:
Frequency resource assignment.
Time resource assignment.
PSFCH-to-HARQ feedback timing indicator
PUCCH resource indicator—3 bits
Configuration index—0 bit if the UE is not configured to monitor DCI format 3_0 with CRC scrambled by SL-CS-RNTI; otherwise 3 bits as defined in clause 8.1.2 of [6, TS 38.214].
Counter sidelink assignment index—2 bits
Padding bits, if required

[ . . . ]

8.3 Sidelink Control Information on PSCCH

SCI carried on PSCCH is a 1$^{st}$-stage SCI, which transports sidelink scheduling information.

8.3.1.1 SCI Format 1-A

SCI format 1-A is used for the scheduling of PSSCH and 2$^{nd}$-stage-SCI on PSSCH The following information is transmitted by means of the SCI format 1-A:

Priority—3 bits as specified in clause 5.4.3.3 of [12, TS 23.287] and clause 5.22.1.3.1 of [8, TS 38.321].

Frequency resource assignment—

$$\left\lceil \log_2\left(\frac{N_{subChannel}^{SL}(N_{subChannel}^{SL}+1)}{2}\right)\right\rceil$$

bits when the value of the higher layer parameter sl-MaxNumPerReserve is configured to 2; otherwise $$\left\lceil \log_2\left(\frac{N_{subChannel}^{SL}(N_{subChannel}^{SL}+1)(2N_{subChannel}^{SL}+1)}{6}\right)\right\rceil$$

bits when the value of the higher layer parameter sl-MaxNumPerReserve is configured to 3, as defined in clause 8.1.5 of [6, TS 38.214].

Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].

Resource reservation period—$\lceil \log_2 N_{rsv\_period} \rceil$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise.

DMRS pattern—$\lceil \log_2 N_{pattern} \rceil$ bits $2^{nd}$-stage SCI format—2 bits as defined in Table 8.3.1.1-1.

Beta_offset indicator—2 bits as provided by higher layer parameter sl-BetaOffsets2ndSCI and Table 8.3.1.1-2.

Number of DMRS port—1 bit as defined in Table 8.3.1.1-3.

Modulation and coding scheme—5 bits as defined in clause 8.1.3 of [6, TS 38.214].

Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.

PSFCH overhead indication—1 bit as defined clause 8.1.3.2 of [6, TS 38.214] if higher layer parameter sl-PSFCH-Period=2 or 4; 0 bit otherwise.

Reserved—a number of bits as determined by higher layer parameter sl-NumReservedBits, with value set to zero.

[Table 8.3.1.1-1 of 3GPP TS 38.212 V16.4.0, entitled "$2^{nd}$-stage SCI formats", is reproduced as FIG. 6]

[Table 8.3.1.1-2 of 3GPP TS 38.212 V16.4.0, entitled "Mapping of Beta_offset indicator values to indexes in Table 9.3-2 of [5, TS38.213]", is reproduced as FIG. 7]

[Table 8.3.1.1-3 of 3GPP TS 38.212 V16.4.0, entitled "Number of DMRS port(s)", is reproduced as FIG. 8]

8.4 Sidelink Control Information on PSSCH

SCI carried on PSSCH is a $2^{nd}$-stage SCI, which transports sidelink scheduling information.

8.4.1.1 SCI Format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits as defined in clause 16.4 of [5, TS 38.213].

New data indicator—1 bit as defined in clause 16.4 of [5, TS 38.213].

Redundancy version—2 bits as defined in clause 16.4 of [6, TS 38.214].

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Cast type indicator—2 bits as defined in Table 8.4.1.1-1.

CSI request—1 bit as defined in clause 8.2.1 of [6, TS 38.214].

[Table 8.4.1.1-1 of 3GPP TS 38.212 V16.4.0, entitled "Cast type indicator", is reproduced as FIG. 9]

8.4.1.2 SCI Format 2-B

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits as defined in clause 16.4 of [5, TS 38.213].

New data indicator—1 bit as defined in clause 16.4 of [5, TS 38.213].

Redundancy version—2 bits as defined in clause 16.4 of [6, TS 38.214].

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Zone ID—12 bits

Communication range requirement—4 bits 8.4.5 Multiplexing of Coded $2^{nd}$-Stage SCI Bits to PSSCH The coded $2^{nd}$-stage SCI bits are multiplexed onto PSSCH according to the procedures in Clause 8.2.1.

3GPP TS 38.321 specifies Discontinuous Reception (DRX)-related procedure in the Medium Access Control (MAC) layer in NR Uu as follows:

5.7 Discontinuous Reception (DRX)

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

RRC controls DRX operation by configuring the following parameters:

drx-onDurationTimer: the duration at the beginning of a DRX cycle;

drx-SlotOffset: the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX cycle starts;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity;

ps-Wakeup (optional): the configuration to start associated drx-onDurationTimer in case DCP is monitored but not detected;

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-Retransmission TimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

When a DRX cycle is configured, the Active Time for Serving Cells in a DRX group includes the time while:
- drx-onDurationTimer or drx-InactivityTimer configured for the DRX group is running; or
- drx-RetransmissionTimerDL or drx-RetransmissionTimerUL is running on any Serving Cell in the DRX group; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:
1> if a MAC PDU is received in a configured downlink assignment:
  2> start the drx-HARQ-RTT-TimerDL for the corresponding HARQ process in the first symbol after the end of the corresponding transmission carrying the DL HARQ feedback;
  2> stop the drx-RetransmissionTimerDL for the corresponding HARQ process.
1> if a MAC PDU is transmitted in a configured uplink grant and LBT failure indication is not received from lower layers:
  2> start the drx-HARQ-RTT-TimerUL for the corresponding HARQ process in the first symbol after the end of the first transmission (within a bundle) of the corresponding PUSCH transmission;
  2> stop the drx-RetransmissionTimerUL for the corresponding HARQ process at the first transmission (within a bundle) of the corresponding PUSCH transmission.
1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.
1> if a drx-HARQ-RTT-TimerUL expires:
  2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
  2> stop drx-onDurationTimer for each DRX group;
  2> stop drx-InactivityTimer for each DRX group.
1> if drx-InactivityTimer for a DRX group expires:
  2> if the Short DRX cycle is configured:
    [ . . . ]
  2> else:
    3> use the Long DRX cycle for this DRX group.
1> if a DRX Command MAC CE is received:
  2> if the Short DRX cycle is configured:
    [ . . . ]
  2> else:
    3> use the Long DRX cycle for each DRX group.
    [ . . . ]
1> if a Long DRX Command MAC CE is received:
  [ . . . ]
  2> use the Long DRX cycle for each DRX group.
  [ . . . ]
1> if the Long DRX cycle is used for a DRX group, and [(SFN×10)+subframe number] modulo (drx-LongCycle)=drx-StartOffset:
  2> if DCP monitoring is configured for the active DL BWP as specified in TS 38.213 [6], clause 10.3:
    3> if DCP indication associated with the current DRX cycle received from lower layer indicated to start drx-onDurationTimer, as specified in TS 38.213 [6]; or
    3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or during a measurement gap, or when the MAC entity monitors for a PDCCH transmission on the search space indicated by recoverySearchSpaceId of the SpCell identified by the C-RNTI while the ra-ResponseWindow is running (as specified in clause 5.1.4); or
    3> if ps-Wakeup is configured with value true and DCP indication associated with the current DRX cycle has not been received from lower layers:
      4> start drx-onDurationTimer after drx-SlotOffset from the beginning of the subframe.
  2> else:
    3> start drx-onDurationTimer for this DRX group after drx-SlotOffset from the beginning of the subframe.
NOTE 2: In case of unaligned SFN across carriers in a cell group, the SFN of the SpCell is used to calculate the DRX duration.
1> if a DRX group is in Active Time:
  2> monitor the PDCCH on the Serving Cells in this DRX group as specified in TS 38.213 [6];
  2> if the PDCCH indicates a DL transmission:
    3> start the drx-HARQ-RTT-TimerDL for the corresponding HARQ process in the first symbol after the end of the corresponding transmission carrying the DL HARQ feedback;
NOTE 3: When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback.
    3> stop the drx-RetransmissionTimerDL for the corresponding HARQ process.
    3> if the PDSCH-to-HARQ_feedback timing indicate a non-numerical k1 value as specified in TS 38.213 [6]:
      4> start the drx-RetransmissionTimerDL in the first symbol after the PDSCH transmission for the corresponding HARQ process.

2> if the PDCCH indicates a UL transmission:
3> start the drx-HARQ-RTT-TimerUL for the corresponding HARQ process in the first symbol after the end of the first transmission (within a bundle) of the corresponding PUSCH transmission;
3> stop the drx-RetransmissionTimerUL for the corresponding HARQ process.
2> if the PDCCH indicates a new transmission (DL or UL) on a Serving Cell in this DRX group:
3> start or restart drx-InactivityTimer for this DRX group in the first symbol after the end of the PDCCH reception.
2> if a HARQ process receives downlink feedback information and acknowledgement is indicated:
3> stop the drx-RetransmissionTimerUL for the corresponding HARQ process.
[ . . . ]
Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected.

The MAC entity needs not to monitor the PDCCH if it is not a complete PDCCH occasion (e.g. the Active Time starts or ends in the middle of a PDCCH occasion).

3GPP TS 38.321 also specifies SL-related procedures in the MAC layer as follows:

5.8.3 Sidelink

There are two types of transmission without dynamic grant:
configured grant Type 1 where an sidelink grant is provided by RRC, and stored as configured sidelink grant;
configured grant Type 2 where an sidelink grant is provided by PDCCH, and stored or cleared as configured sidelink grant based on L1 signalling indicating configured sidelink grant activation or deactivation.

Type 1 and/or Type 2 are configured with a single BWP. Multiple configurations of up to 8 configured grants (including both Type 1 and Type 2, if configured) can be active simultaneously on the BWP.

RRC configures the following parameters when the configured grant Type 1 is configured, as specified in TS 38.331 [5] or TS 36.331 [21]:
sl-ConfigIndexCG: the identifier of a configured grant for sidelink;
sl-CS-RNTI: SLCS-RNTI for retransmission;
sl-NrOfHARQ-Processes: the number of HARQ processes for configured grant;
sl-PeriodCG: periodicity of the configured grant Type 1;
sl-TimeOffsetCG-Type1: Offset of a resource with respect to SFN=sl-TimeReferenceSFN-Type1 in time domain, referring to the number of logical slots that can be used for SL transmission;
sl-TimeResourceCG-Type1: time resource location of the configured grant Type 1;
sl-CG-MaxTransNumList: the maximum number of times that a TB can be transmitted using the configured grant;
sl-HARQ-ProcID-offset: offset of HARQ process for configured grant Type 1;
sl-TimeReferenceSFN-Type1: SFN used for determination of the offset of a resource in time domain. The UE uses the closest SFN with the indicated number preceding the reception of the sidelink configured grant configuration Type 1.

RRC configures the following parameters when the configured grant Type 2 is configured, as specified in TS 38.331 [5]:
sl-ConfigIndexCG: the identifier of a configured grant for sidelink;
sl-CS-RNTI: SLCS-RNTI for activation, deactivation, and retransmission;
sl-NrOfHARQ-Processes: the number of HARQ processes for configured grant;
sl-PeriodCG: periodicity of the configured grant Type 2;
sl-CG-MaxTransNumList: the maximum number of times that a TB can be transmitted using the configured grant;
sl-HARQ-ProcID-offset: offset of HARQ process for configured grant Type 2.

Upon configuration of a configured grant Type 1, the MAC entity shall for each configured sidelink grant:
1> store the sidelink grant provided by RRC as a configured sidelink grant;
1> initialise or re-initialise the configured sidelink grant to determine PSCCH duration(s) and PSSCH duration(s) according to sl-TimeOffsetCG-Type1 and sl-TimeResourceCG-Type1, and to reoccur with sl-periodCG for transmissions of multiple MAC PDUs according to clause 8.1.2 of TS 38.214 [7].

NOTE 1: If the MAC entity is configured with multiple configured sidelink grants, collision among the configured sidelink grants may occur. How to handle the collision is left to UE implementation.

After a sidelink grant is configured for a configured grant Type 1, the MAC entity shall consider sequentially that the first slot of the $S^{th}$ sidelink grant occurs in the logical slot for which:

[(SFN×numberOfSLSlotsPerFrame)+logical slot number in the frame]=(sl-TimeReferenceSFN-Type1×numberOfSLSlotsPerFrame+sl-TimeOffsetCGType1+S×PeriodicitySL)modulo(1024× numberOfSLSlotsPerFrame).

where $$PeriodicitySL = \left\lceil \frac{N}{20 \text{ ms}} \times \text{sl\_periodCG} \right\rceil,$$

numberOfSLSlotsPerFrame refers to the number of logical slots that can be used for SL transmission in the frame and N refer to the number of slots that can be used for SL transmission within 20 ms, if configured, of TDD-UL-DL-ConfigCommon, as specified in TS 38.331 [5] and clause 8.1.7 of TS 38.214 [7].

After a sidelink grant is configured for a configured grant Type 2, the MAC entity shall consider sequentially that the first slot of $S^{th}$ sidelink grant occurs in the logical slot for which:

[(SFN×numberOfSLSlotsPerFrame)+logical slot number in the frame]=[(SFN$_{start\ time}$×numberOfSLSlotsPerFrame+slot$_{start\ time}$)+S×PeriodicitySL]modulo(1024×numberOfSLSlotsPerFrame).

where SFN$_{start\ time}$ and slot$_{start\ time}$ are the SFN and logical slot, respectively, of the first transmission opportunity of PSSCH where the configured sidelink grant was (re-)initialised.

When a configured sidelink grant is released by RRC, all the corresponding configurations shall be released and all corresponding sidelink grants shall be cleared.

The MAC entity shall:

1> if the configured sidelink grant confirmation has been triggered and not cancelled; and
1> if the MAC entity has UL resources allocated for new transmission:
   2> instruct the Multiplexing and Assembly procedure to generate a Sidelink Configured Grant Confirmation MAC CE as defined in clause 6.1.3.34;
   2> cancel the triggered configured sidelink grant confirmation.

For a configured grant Type 2, the MAC entity shall clear the corresponding configured sidelink grant immediately after first transmission of Sidelink Configured Grant Confirmation MAC CE triggered by the configured sidelink grant deactivation.

[ . . . ]

5.22 SL-SCH Data Transfer
5.22.1 SL-SCH Data Transmission
5.22.1.1 SL Grant Reception and SCI Transmission Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 is considered as a dynamic sidelink grant.

If the MAC entity has been configured with Sidelink resource allocation mode 1 as indicated in TS 38.331 [5], the MAC entity shall for each PDCCH occasion and for each grant received for this PDCCH occasion:
1> if a sidelink grant has been received on the PDCCH for the MAC entity's SL-RNTI:
   2> if the NDI received on the PDCCH has not been toggled compared to the value in the previously received HARQ information for the HARQ Process ID:
      3> use the received sidelink grant to determine PSCCH duration(s) and PSSCH duration(s) for one or more retransmissions of a single MAC PDU for the corresponding Sidelink process according to clause 8.1.2 of TS 38.214 [7].
   2> else:
      3> use the received sidelink grant to determine PSCCH duration(s) and PSSCH duration(s) for initial transmission and, if available, retransmission(s) of a single MAC PDU according to clause 8.1.2 of TS 38.214 [7].
   2> if a sidelink grant is available for retransmission(s) of a MAC PDU which has been positively acknowledged as specified in clause 5.22.1.3.1a:
      3> clear the PSCCH duration(s) and PSSCH duration(s) corresponding to retransmission(s) of the MAC PDU from the sidelink grant.
1> else if a sidelink grant has been received on the PDCCH for the MAC entity's SLCS-RNTI:
   2> if PDCCH contents indicate retransmission(s) for the identified HARQ process ID that has been set for an activated configured sidelink grant identified by sl-ConfigIndexCG:
      3> use the received sidelink grant to determine PSCCH duration(s) and PSSCH duration(s) for one or more retransmissions of a single MAC PDU according to clause 8.1.2 of TS 38.214 [7].
   2> else if PDCCH contents indicate configured grant Type 2 deactivation for a configured sidelink grant:
      3> trigger configured sidelink grant confirmation for the configured sidelink grant.
   2> else if PDCCH contents indicate configured grant Type 2 activation for a configured sidelink grant:
      3> trigger configured sidelink grant confirmation for the configured sidelink grant;
      3> store the configured sidelink grant;
      3> initialise or re-initialise the configured sidelink grant to determine the set of PSCCH durations and the set of PSSCH durations for transmissions of multiple MAC PDUs according to clause 8.1.2 of TS 38.214 [7].

If the MAC entity has been configured with Sidelink resource allocation mode 2 to transmit using pool(s) of resources in a carrier as indicated in TS 38.331 [5] or TS 36.331 [21] based on sensing or random selection, the MAC entity shall for each Sidelink process:

NOTE 1: If the MAC entity is configured with Sidelink resource allocation mode 2 to transmit using a pool of resources in a carrier as indicated in TS 38.331 [5] or TS 36.331 [21], the MAC entity can create a selected sidelink grant on the pool of resources based on random selection or sensing only after releasing configured sidelink grant(s), if any.

1> if the MAC entity has selected to create a selected sidelink grant corresponding to transmissions of multiple MAC PDUs, and SL data is available in a logical channel:
[ . . . ]
   2> perform the TX resource (re-)selection check on the selected pool of resources as specified in clause 5.22.1.2;
   2> if the TX resource (re-)selection is triggered as the result of the TX resource (re-)selection check:
      3> select one of the allowed values configured by RRC in sl-ResourceReservePeriodList and set the resource reservation interval, $P_{rsvp\_TX}$, with the selected value;
      3> randomly select, with equal probability, an integer value in the interval [5, 15] for the resource reservation interval higher than or equal to 100 ms or in the interval $$\left[5 \times \left\lceil \frac{100}{\max(20, P_{rsvp\_TX})} \right\rceil, 15 \times \left\lceil \frac{100}{\max(20, P_{rsvp\_TX})} \right\rceil \right]$$

for the resource reservation interval lower than 100 ms and set SL_RESOURCE_RESELECTION_COUNTER to the selected value;
      3> select the number of HARQ retransmissions from the allowed numbers that are configured by RRC in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;

3> select an amount of frequency resources within the range that is configured by RRC between sl-MinSubChannelNumPSSCH and sl-MaxSubchannelNumPSSCH included in sl-PSSCH-TxConfigList and, if configured by RRC, overlapped between MinSubChannelNumPSSCH and MaxSubchannelNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
3> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier.
3> use the randomly selected resource to select a set of periodic resources spaced by the resource reservation interval for transmissions of PSCCH and PSSCH corresponding to the number of transmission opportunities of MAC PDUs determined in TS 38.214 [7];
3> if one or more HARQ retransmissions are selected:
4> if there are available resources left in the resources indicated by the physical layer according to clause 8.1.4 of TS 38.214 [7] for more transmission opportunities:
5> randomly select the time and frequency resources for one or more transmission opportunities from the available resources, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources and that a retransmission resource can be indicated by the time resource assignment of a prior SCI according to clause 8.3.1.1 of TS 38.212 [9];
5> use the randomly selected resource to select a set of periodic resources spaced by the resource reservation interval for transmissions of PSCCH and PSSCH corresponding to the number of retransmission opportunities of the MAC PDUs determined in TS 38.214 [7];
5> consider the first set of transmission opportunities as the initial transmission opportunities and the other set(s) of transmission opportunities as the retransmission opportunities;
5> consider the sets of initial transmission opportunities and retransmission opportunities as the selected sidelink grant.
3> else:
4> consider the set as the selected sidelink grant.
3> use the selected sidelink grant to determine the set of PSCCH durations and the set of PSSCH durations according to TS 38.214 [7].
[ . . . ]
1> if the MAC entity has selected to create a selected sidelink grant corresponding to transmission(s) of a single MAC PDU, and if SL data is available in a logical channel, or a SL-CSI reporting is triggered:
[ . . . ]
2> perform the TX resource (re-)selection check on the selected pool of resources as specified in clause 5.22.1.2;
2> if the TX resource (re-)selection is triggered as the result of the TX resource (re-)selection check:
3> select the number of HARQ retransmissions from the allowed numbers that are configured by RRC in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
3> select an amount of frequency resources within the range that is configured by RRC between sl-MinSubChannelNumPSSCH and sl-MaxSubChannelNumPSSCH included in sl-PSSCH-TxConfigList and, if configured by RRC, overlapped between sl-MinSubChannelNumPSSCH and sl-MaxSubChannelNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
3> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier, and the latency requirement of the triggered SL CSI reporting;
3> if one or more HARQ retransmissions are selected:
4> if there are available resources left in the resources indicated by the physical layer according to clause 8.1.4 of TS 38.214 [7] for more transmission opportunities:
5> randomly select the time and frequency resources for one or more transmission opportunities from the available resources, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources, and that a retransmission resource can be indicated by the time resource assignment of a prior SCI according to clause 8.3.1.1 of TS 38.212 [9];
5> consider a transmission opportunity which comes first in time as the initial transmission opportunity and other transmission opportunities as the retransmission opportunities;
5> consider all the transmission opportunities as the selected sidelink grant;
3> else:
4> consider the set as the selected sidelink grant;
3> use the selected sidelink grant to determine PSCCH duration(s) and PSSCH duration(s) according to TS 38.214 [7].
[ . . . ]
For a selected sidelink grant, the minimum time gap between any two selected resources comprises:
a time gap between the end of the last symbol of a PSSCH transmission of the first resource and the start of the first symbol of the corresponding PSFCH reception determined by sl-MinTimeGapPSFCH and sl-PSFCH-Period for the pool of resources; and
a time required for PSFCH reception and processing plus sidelink retransmission preparation including multiplexing of necessary physical channels and any TX-RX/RX-TX switching time.
The MAC entity shall for each PSSCH duration:
1> for each sidelink grant occurring in this PSSCH duration:
2> if the MAC entity has been configured with Sidelink resource allocation mode 1:
[ . . . ]
3> set the resource reservation interval to 0ms.
2> else:
[ . . . ]
3> if the MAC entity decides not to use the selected sidelink grant for the next PSSCH duration:
4> set the resource reservation interval to 0ms.
3> else:
4> set the resource reservation interval to the selected value.
[ . . . ]
2> if the configured sidelink grant has been activated and this PSSCH duration corresponds to the first PSSCH transmission opportunity within this sl-PeriodCG of the configured sidelink grant:
3> set the HARQ Process ID to the HARQ Process ID associated with this PSSCH duration and, if available, all subsequent PSSCH duration(s) occurring in this sl-PeriodCG for the configured sidelink grant;
3> determine that this PSSCH duration is used for initial transmission;
3> flush the HARQ buffer of Sidelink process associated with the HARQ Process ID.
2> deliver the sidelink grant, the selected MCS, and the associated HARQ information to the Sidelink HARQ Entity for this PSSCH duration.
[ . . . ]
5.22.1.3 Sidelink HARQ Operation
5.22.1.3.1 Sidelink HARQ Entity
The MAC entity includes at most one Sidelink HARQ entity for transmission on SL-SCH, which maintains a number of parallel Sidelink processes.
The maximum number of transmitting Sidelink processes associated with the Sidelink HARQ Entity is 16. A sidelink process may be configured for transmissions of multiple MAC PDUs. For transmissions of multiple MAC PDUs with Sidelink resource allocation mode 2, the maximum number of transmitting Sidelink processes associated with the Sidelink HARQ Entity is 4.

A delivered sidelink grant and its associated Sidelink transmission information are associated with a Sidelink process. Each Sidelink process supports one TB.
For each sidelink grant, the Sidelink HARQ Entity shall:
1> if the MAC entity determines that the sidelink grant is used for initial transmission as specified in clause 5.22.1.1; or
1> if the sidelink grant is a configured sidelink grant and no MAC PDU has been obtained in a sl-PeriodCG of the configured sidelink grant:
[ . . . ]
2> (re-)associate a Sidelink process to this grant, and for the associated Sidelink process:
[ . . . ]
3> obtain the MAC PDU to transmit from the Multiplexing and assembly entity, if any;
3> if a MAC PDU to transmit has been obtained:
4> if a HARQ Process ID has been set for the sidelink grant:
5> (re-)associate the HARQ Process ID corresponding to the sidelink grant to the Sidelink process;
[ . . . ]
4> determines Sidelink transmission information of the TB for the source and destination pair of the MAC PDU as follows:
5> set the Source Layer-1 ID to the 8 LSB of the Source Layer-2 ID of the MAC PDU;
5> set the Destination Layer-1 ID to the 16 LSB of the Destination Layer-2 ID of the MAC PDU;
5> (re-)associate the Sidelink process to a Sidelink process ID;
[ . . . ]
5> set the cast type indicator to one of broadcast, groupcast and unicast as indicated by upper layers;
5> if HARQ feedback has been enabled for the MAC PDU according to clause 5.22.1.4.2;
6> set the HARQ feedback enabled/disabled indicator to enabled.
5> else:
6> set the HARQ feedback enabled/disabled indicator to disabled.
5> set the priority to the value of the highest priority of the logical channel(s), if any, and a MAC CE, if included, in the MAC PDU;
5> if HARQ feedback is enabled for groupcast:
6> if both a group size and a member ID are provided by upper layers and the group size is not greater than the number of candidate PSFCH resources associated with this sidelink grant:
7> select either positive-negative acknowledgement or negative-only acknowledgement.
[ . . . ]
6> else:
7> select negative-only acknowledgement.
6> if negative-only acknowledgement is selected, UE's location information is available, and sl-TransRange has been configured for a logical channel in the MAC PDU, and sl-ZoneConfig is configured as specified in TS 38.331 [5]:
7> set the communication range requirement to the value of the longest communication range of the logical channel(s) in the MAC PDU;
7> determine the value of sl-ZoneLength corresponding to the communication range requirement and set Zone_id to the value of Zone_id calculated using the determined value of sl-ZoneLength as specified in TS 38.331 [5].
4> deliver the MAC PDU, the sidelink grant and the Sidelink transmission information of the TB to the associated Sidelink process;
4> instruct the associated Sidelink process to trigger a new transmission.
3> else:
4> flush the HARQ buffer of the associated Sidelink process.
1> else (i.e. retransmission):
2> if the HARQ Process ID corresponding to the sidelink grant received on PDCCH, the configured sidelink grant or the selected sidelink grant is associated to a Sidelink process of which HARQ buffer is empty; or
2> if the HARQ Process ID corresponding to the sidelink grant received on PDCCH is not associated to any Sidelink process:
3> ignore the sidelink grant.
2> else:
3> identify the Sidelink process associated with this grant, and for the associated Sidelink process:
4> deliver the sidelink grant of the MAC PDU to the associated Sidelink process;
4> instruct the associated Sidelink process to trigger a retransmission.

5.22.1.3.1a Sidelink Process

The Sidelink process is associated with a HARQ buffer.

New transmissions and retransmissions are performed on the resource indicated in the sidelink grant as specified in clause 5.22.1.1 and with the MCS selected as specified in clause 8.1.3.1 of TS 38.214 [7] and clause 5.22.1.1.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

If the Sidelink HARQ Entity requests a new transmission, the Sidelink process shall:
  1> store the MAC PDU in the associated HARQ buffer;
  1> store the sidelink grant received from the Sidelink HARQ Entity;
  1> generate a transmission as described below.

If the Sidelink HARQ Entity requests a retransmission, the Sidelink process shall:
  1> store the sidelink grant received from the Sidelink HARQ Entity;
  1> generate a transmission as described below.

To generate a transmission, the Sidelink process shall:
  1> if there is no uplink transmission; or
  1> if the MAC entity is able to simultaneously perform uplink transmission(s) and sidelink transmission at the time of the transmission; or
  1> if the other MAC entity and the MAC entity are able to simultaneously perform uplink transmission(s) and sidelink transmission at the time of the transmission respectively; or
  1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:
    2> instruct the physical layer to transmit SCI according to the stored sidelink grant with the associated Sidelink transmission information;
    2> instruct the physical layer to generate a transmission according to the stored sidelink grant;
    2> if HARQ feedback has been enabled the MAC PDU according to clause 5.22.1.4.2:
      3> instruct the physical layer to monitor PSFCH for the transmission and perform PSFCH reception as specified in clause 5.22.1.3.2.
    [ . . . ]
1> if this transmission corresponds to the last transmission of the MAC PDU:
  2> decrement SL_RESOURCE_RESELECTION_COUNTER by 1, if available.
[ . . . ]
1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum; or
1> if a positive acknowledgement to this transmission of the MAC PDU was received according to clause 5.22.1.3.2; or
1> if negative-only acknowledgement was enabled in the SCI and no negative acknowledgement was received for this transmission of the MAC PDU according to clause 5.22.1.3.2:
  2> flush the HARQ buffer of the associated Sidelink process.
[ . . . ]

5.22.1.4 Multiplexing and Assembly

For PDU(s) associated with one SCI, MAC shall consider only logical channels with the same Source Layer-2 ID-Destination Layer-2 ID pair for one of unicast, groupcast and broadcast which is associated with the pair. Multiple transmissions for different Sidelink processes are allowed to be independently performed in different PSSCH durations.

5.22.1.4.1 Logical Channel Prioritization 5.22.1.4.1.1 General

The sidelink Logical Channel Prioritization procedure is applied whenever a new transmission is performed.

RRC controls the scheduling of sidelink data by signalling for each logical channel:
  sl-Priority where an increasing priority value indicates a lower priority level;
  sl-PrioritisedBitRate which sets the sidelink Prioritized Bit Rate (sPBR);
  sl-BucketSizeDuration which sets the sidelink Bucket Size Duration (sBSD).

RRC additionally controls the LCP procedure by configuring mapping restrictions for each logical channel:
  sl-configuredGrantType1Allowed which sets whether a configured grant Type 1 can be used for sidelink transmission;
  sl-AllowedCG-List which sets the allowed configured grant(s) for sidelink transmission;
  sl-HARQ-FeedbackEnabled which sets whether the logical channel is allowed to be multiplexed with logical channel(s) with sl-HARQ-FeedbackEnabled set to enabled or disabled.

The following UE variable is used for the Logical channel prioritization procedure:
  SBj which is maintained for each logical channel j.

The MAC entity shall initialize SBj of the logical channel to zero when the logical channel is established.

For each logical channel j, the MAC entity shall:
- 1> increment SBj by the product sPBR×T before every instance of the LCP procedure, where T is the time elapsed since SBj was last incremented;
- 1> if the value of SBj is greater than the sidelink bucket size (i.e. sPBR×sBSD):
  - 2> set SBj to the sidelink bucket size.
- NOTE: The exact moment(s) when the UE updates SBj between LCP procedures is up to UE implementation, as long as SBj is up to date at the time when a grant is processed by LCP.

5.22.1.4.1.2 Selection of Logical Channels

The MAC entity shall for each SCI corresponding to a new transmission:
- 1> select a Destination associated to one of unicast, groupcast and broadcast, having at least one of the MAC CE and the logical channel with the highest priority, among the logical channels that satisfy all the following conditions and MAC CE(s), if any, for the SL grant associated to the SCI:
  - 2> SL data is available for transmission; and
  - 2> SBj>0, in case there is any logical channel having SBj>0; and
  - 2> sl-configuredGrantType1Allowed, if configured, is set to true in case the SL grant is a Configured Grant Type 1; and
  - 2> sl-AllowedCG-List, if configured, includes the configured grant index associated to the SL grant; and
  - 2> sl-HARQ-FeedbackEnabled is set to disabled, if PSFCH is not configured for the SL grant associated to the SCI.
- NOTE: If multiple Destinations have the logical channels satisfying all conditions above with the same highest priority or if multiple Destinations have either the MAC CE and/or the logical channels satisfying all conditions above with the same priority as the MAC CE, which Destination is selected among them is up to UE implementation.
- 1> select the logical channels satisfying all the following conditions among the logical channels belonging to the selected Destination:
  - 2> SL data is available for transmission; and
  - 2> sl-configuredGrantType1Allowed, if configured, is set to true in case the SL grant is a Configured Grant Type 1; and.
  - 2> sl-AllowedCG-List, if configured, includes the configured grant index associated to the SL grant; and
    - 3> if PSFCH is configured for the sidelink grant associated to the SCI:
      - 4> sl-HARQ-FeedbackEnabled is set to enabled, if sl-HARQ-FeedbackEnabled is set to enabled for the highest priority logical channel satisfying the above conditions; or
      - 4> sl-HARQ-FeedbackEnabled is set to disabled, if sl-HARQ-FeedbackEnabled is set to disabled for the highest priority logical channel satisfying the above conditions.
    - 3> else: 4> sl-HARQ-FeedbackEnabled is set to disabled.

5.22.1.4.1.3 Allocation of Sidelink Resources

The MAC entity shall for each SCI corresponding to a new transmission:
- 1> allocate resources to the logical channels as follows:
  - 2> logical channels selected in clause 5.22.1.4.1.2 for the SL grant with SBj>0 are allocated resources in a decreasing priority order. If the sPBR of a logical channel is set to infinity, the MAC entity shall allocate resources for all the data that is available for transmission on the logical channel before meeting the sPBR of the lower priority logical channel(s);
  - 2> decrement SBj by the total size of MAC SDUs served to logical channel j above;
  - 2> if any resources remain, all the logical channels selected in clause 5.22.1.4.1.2 are served in a strict decreasing priority order (regardless of the value of SBj) until either the data for that logical channel or the SL grant is exhausted, whichever comes first. Logical channels configured with equal priority should be served equally.
- NOTE: The value of SBj can be negative.

The UE shall also follow the rules below during the SL scheduling procedures above:
- the UE should not segment an RLC SDU (or partially transmitted SDU or retransmitted RLC PDU) if the whole SDU (or partially transmitted SDU or retransmitted RLC PDU) fits into the remaining resources of the associated MAC entity;
- if the UE segments an RLC SDU from the logical channel, it shall maximize the size of the segment to fill the grant of the associated MAC entity as much as possible;
- the UE should maximise the transmission of data;
- if the MAC entity is given a sidelink grant size that is equal to or larger than 12 bytes while having data available and allowed (according to clause 5.22.1.4.1) for transmission, the MAC entity shall not transmit only padding;
- A logical channel configured with sl-HARQ-FeedbackEnabled set to enabled and a logical channel configured with sl-HARQ-FeedbackEnabled set to disabled cannot be multiplexed into the same MAC PDU.

The MAC entity shall not generate a MAC PDU for the HARQ entity if the following conditions are satisfied:
- there is no Sidelink CSI Reporting MAC CE generated for this PSSCH transmission as specified in clause 5.22.1.7; and
- the MAC PDU includes zero MAC SDUs.

Logical channels shall be prioritised in accordance with the following order (highest priority listed first):
- data from SCCH;
- Sidelink CSI Reporting MAC CE;
- data from any STCH.

5.22.1.4.2 Multiplexing of MAC Control Elements and MAC SDUs

The MAC entity shall multiplex a MAC CE and MAC SDUs in a MAC PDU according to clauses 5.22.1.4.1 and 6.1.6.

[ . . . ]

3GPP TS 38.331 specifies SL-related configurations in the Radio Resource Control (RRC) layer as follows:

SL-ConfiguredGrantConfig

The IE SL-ConfiguredGrantConfig specifies the configured grant configuration information for NR Sidelink communication.

| SL-ConfiguredGrantConfig Information element |
| --- |
| `-- ASN1START`<br>`-- TAG-SL-CONFIGUREDGRANTCONFIG-START`<br>`SL-ConfiguredGrantConfig-r16 ::=        SEQUENCE {`<br>`    sl-ConfigIndexCG-r16                 SL-ConfigIndexCG-r16,`<br>`    sl-PeriodCG-r16                      SL-PeriodCG-r16                                OPTIONAL,  -- Need M`<br>`    sl-NrOfHARQ-Processes-r16            INTEGER (1..16)                                OPTIONAL,  -- Need M`<br>`    sl-HARQ-ProcID-offset-r16            INTEGER (1..16)                                OPTIONAL,  -- Need M`<br>`    sl-CG-MaxTransNumList-r16            SL-CG-MaxTransNumList-r16                      OPTIONAL,  -- Need M`<br>`    rrc-ConfiguredSidelinkGrant-r16      SEQUENCE {`<br>`        sl-TimeResourceCG-Type1-r16          INTEGER (0..496)                           OPTIONAL,  -- Need M`<br>`        sl-StartSubchannelCG-Type1-r16       INTEGER (0..26)                            OPTIONAL,  -- Need M`<br>`        sl-FreqResourceCG-Type1-r16          INTEGER (0..6929)                          OPTIONAL,  -- Need M`<br>`        sl-TimeOffsetCG-Type1-r16            INTEGER (0..7999)                          OPTIONAL,  -- Need R`<br>`        sl-N1PUCCH-AN-r16                    PUCCH-ResourceId                           OPTIONAL,  -- Need M`<br>`        sl-PSFCH-ToPUCCH-CG-Type1-r16        INTEGER (0..15)                            OPTIONAL,  -- Need M`<br>`        sl-ResourcePoolID-r16                SL-ResourcePoolID-r16                      OPTIONAL,  -- Need M`<br>`        sl-TimeReferenceSFN-Type1-r16        ENUMERATED (sfn512)                        OPTIONAL   -- Need S`<br>`    }                                    OPTIONAL,  -- Need M`<br>`    ...`<br>`}`<br>`SL-ConfigIndexCG-r16 ::=             INTEGER (1..maxNrofCG-SL-r16)`<br>`SL-CG-MaxTransNumList-r16 ::=        SEQUENCE (SIZE (1..8)) OF SL-CG-MaxTransNum-r16`<br>`SL-CG-MaxTransNum-r16 ::=            SEQUENCE {`<br>`    sl-Priority-r16                      INTEGER (1..8),`<br>`    sl-MaxTransNum-r16                   INTEGER (1..32)`<br>`}`<br>`SL-PeriodCG-r16 :=                   CHOICE {`<br>`    sl-PeriodCG1-r16                     ENUMERATED (ms100, ms200, ms300, ms400, ms500, ms600, ms700,`<br>`ms800, ms900, ms1000, spare6,           spare5, spare4, spare3, spare2, spare1},`<br>`    sl-PeriodCG2-r16                     INTEGER (1..99)`<br>`}`<br>`-- TAG-SL-CONFIGUREDGRANTCONFIG-STOP`<br>`-- ASN1STOP` |

| SL-ConfiguredGrantConfig field descriptions |
| --- |
| sl-ConfigIndexCG<br>This field indicates the ID to identify configured grant for sidelink.<br>sl-CG-MaxTransNumList<br>This field indicates the maximum number of times that a TB can be transmitted using the resources provided by the configured grant. sl-Priority corresponds to the logical channel priority.<br>sl-FreqResourceCG-Type1<br>Indicates the frequency resource location of sidelink configured grant type 1. An index giving valid combinations of one or two starting sub-channel and length (joinly encoded) as resource indicator (RIV), as defined in TS 38.214 [19].<br>[. . .]<br>sl-PeriodCG<br>This field indicates the period of sidelink configured grant in the unit of ms.<br>[. . .]<br>sl-ResourcePoolID<br>Indicates the resource pool in which the configured sidelink grant Type 1 is applied.<br>sl-StartSubchannelCG-Type1<br>This field indicates the starting sub-channel of sidelink configured grant Type 1. An index giving valid sub-channel index.<br>[. . .]<br>sl-TimeResourceCG-Type1<br>This field indicates the time resource location of sidelink configured grant Type 1. An index giving valid combinations of up to two slot positions (jointly encoded) as time resource indicator (TRIV), as defined in TS 38.212 [17]. |

3GPP RP-202846 specifies the Work Item Description (WID) on NR sidelink enhancement as follows:

3 Justification

TSG RAN started discussions in RAN #84 to identify the detailed motivations and work areas for NR sidelink enhancements in Rel-17. Based on the latest summary in RP-192745, significant interest has been observed for the several motivations including the following:

Power saving enables UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized.

[ . . . ]

4 Objective 4.1 Objective of SI or Core Part WI or Testing Part WI

The objective of this work item is to specify radio solutions that can enhance NR sidelink for the V2X, public safety and commercial use cases.

[ . . . ]

2. Resource Allocation Enhancement:
  Specify resource allocation to reduce power consumption of the UEs [RAN1, RAN2]
    Baseline is to introduce the principle of Rel-14 LTE sidelink random resource selection and partial sensing to Rel-16 NR sidelink resource allocation mode 2.
    Note: Taking Rel-14 as the baseline does not preclude introducing a new solution to reduce power consumption for the cases where the baseline cannot work properly.
    This work should consider the impact of sidelink DRX, if any.
  . . .
3. Sidelink DRX for Broadcast, Groupcast, and Unicast [RAN2]
  Define on- and off-durations in sidelink and specify the corresponding UE procedure
  Specify mechanism aiming to align sidelink DRX wake-up time among the UEs communicating with each other
  Specify mechanism aiming to align sidelink DRX wake-up time with Uu DRX wake-up time in an in-coverage UE
[ . . . ]

In the RAN1 #103-e meeting, RAN1 has the following agreements about NR V2X, as captured in the Final Report of 3GPP TSG RAN WG1 #103-e V1.0.0 (Online meeting, 26 Oct.-13 Nov. 2020):

Agreements:
  Partial sensing based RA is supported as a power saving RA scheme
  Random resource selection is supported as a power saving RA scheme
Agreements:
  In R17, a SL Mode 2 Tx resource pool can be (pre-)configured to enable full sensing only, partial sensing only, random resource selection only, or any combination(s) thereof In the RAN2 #112-e meeting, RAN2 has the following agreements about NR V2X, as captured in 3GPP R2-2100001:

Agreements on SL DRX:
1: Sidelink DRX needs to support sidelink communications for both in and out of network's coverage scenarios.
[. . .]
3: Support SL DRX for all casting types.
4: If a UE is in SL active time, UE should monitor PSCCH. FFS on PSSCH. FFS for sensing impacts.
[. . .]
6: As baseline, for Sidelink DRX for SL unicast, it is proposed to inherit and use timers similar to what are used in Uu DRX. FFS for SL broadcast/groupcast. FFS on detailed timers.
7: Working assumption: SL DRX should take PSCCH monitoring also for sensing (in addition to data reception) into account if SL DRX is used.
[. . .]

In 3GPP R1-2009460, there is LS on RAN1 conclusion about the RAN2 question as follows:

1. Overall Description:
RAN1 received the LS in R1-2007522 (R2-2008586) from RAN2 with the following question:

Question:
Is it possible to use the retransmission opportunities for initial transmission for a sidelink configured grant in case when the data was not available for the transmission opportunity for initial transmission?

From RAN1 perspective, it is possible to use the retransmission opportunities for initial transmission for a sidelink configured grant in case when the data was not available for the transmission opportunity for initial transmission.

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

Cell: A cell is composed of one or multiple associated TRPs, i.e. coverage of the cell is composed of coverage of all associated TRP(s). One cell is controlled by one BS. Cell could also be referred to as TRP group (TRPG).

Slot: A scheduling unit in NR. Each slot duration is 14 OFDM symbols.

One or multiple of following assumptions for network side may be used hereafter:

Downlink timing of TRPs in the same cell are synchronized.

RRC layer of network side is in BS.

One or multiple of following assumptions for UE side may be used hereafter:

There are at least two UE (RRC) states: connected state (or called active state) and non-connected state (or called inactive state or idle state). Inactive state may be an additional state or belong to connected state or non-connected state.

Figure 10:
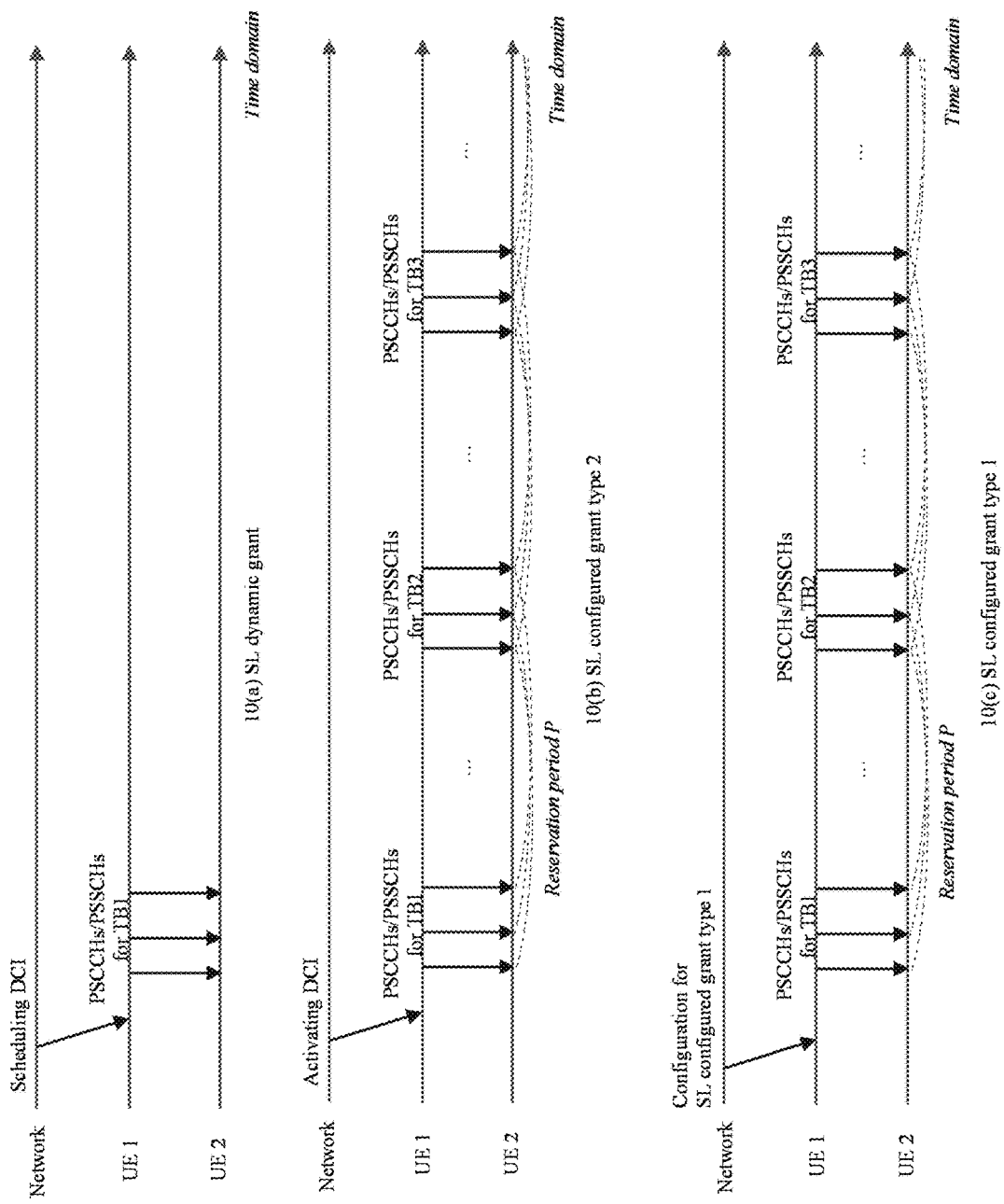
FIG. 10 is a diagram according to one exemplary embodiment.

For network scheduling mode, e.g. NR sidelink resource allocation mode 1, the network node may transmit a sidelink (SL) grant on Uu interface for scheduling resources of Physical Sidelink Control Channel (PSCCH) and/or Physical Sidelink Shared Channel (PSSCH). The V2X UE may perform PSCCH and PSSCH transmissions on PC5 interface, in response to the receive sidelink grant. The Uu interface means the wireless interface for communication between network and UE. The PC5 interface means the wireless interface for communication (directly) between UEs or devices. Moreover, in sidelink resource allocation mode 1, dynamic grant, configured grant type 1 and configured grant type 2 are supported:

- For a sidelink dynamic grant, the network node may transmit a scheduling DCI to UE.
- The scheduling DCI, such as DCI format 3_0, can schedule or indicate at most three PSCCH or PSSCH resources. The UE receiving the scheduling DCI may perform one or more PSCCH or PSSCH transmissions respectively on the scheduled or indicated PSCCH or PSSCH resources, wherein the one or more PSCCH or PSSCH transmission includes, delivers, or comprises the same transport block (TB).
- As shown in FIG. 10(a), UE1 receives a scheduling DCI from network node, wherein the scheduling DCI schedules or indicates three PSCCH or PSSCH resources. When UE1 has available sidelink data, UE1 may perform three PSCCH or PSSCH transmissions respectively on the three scheduled or indicated PSCCH or PSSCH resources, wherein the three PSCCH or PSSCH transmissions includes, delivers, or comprises the same TB1 for UE2. In one embodiment, UE1 may perform logical channel prioritization and generate TB1, wherein TB1 comprises sidelink data from at least a logical channel with highest priority among logical channels with available sidelink data. UE1 may determine destination or UE, associated with the generated TB1, based on the logical channel with highest priority, e.g. the UE2.
- For a sidelink configured grant type 2, the network node may transmit an activating DCI to UE. The activating DCI, such as DCI format 3_0, can schedule or indicate at most three PSCCH or PSSCH resources. The UE receiving the scheduling DCI may perform one or more PSCCH or PSSCH transmissions respectively on the scheduled or indicated PSCCH or PSSCH resources, wherein the one or more PSCCH or PSSCH transmission includes, delivers, or comprises the same transport block (TB). Moreover, the UE may determine a resource reservation period associated with the activated sidelink configured grant type 2. For instance, the activating DCI may indicate an index associated with one configuration for SL configured grant type 2, where associated resource reservation period is indicated in the one configuration for SL configured grant type 2.
- As shown in FIG. 10(b), UE1 receives an activating DCI from network node, wherein the activating DCI schedules or indicates three PSCCH or PSSCH resources. Moreover, UE1 may determine an associated resource reservation period P, and UE1 can derive or determine periodic reserved resources based on the three PSCCH or PSSCH resources and the resource reservation period P. In other words, the three PSCCH or PSSCH resources occur periodically based on the resource reservation period P. These periodically PSCCH or PSSCH resources are transmission opportunities for UE1 to perform sidelink transmissions. As shown in FIG. 10(b), UE1 may perform three PSCCH or PSSCH transmissions respectively on a set of the three scheduled or indicated PSCCH or PSSCH resources in T1, T2, T3, wherein the three PSCCH or PSSCH transmissions includes, delivers, or comprises the same TB1 for UE2. The UE may perform another three PSCCH or PSSCH transmissions respectively on another set of three scheduled or indicated PSCCH or PSSCH resources in T1+P, T2+P, T3+P, wherein the another three PSCCH or PSSCH transmissions includes, delivers, or comprises the same TB2 for UE2 or for another UE. Note that each set of three scheduled or indicated PSCCH or PSSCH resources are utilized for transmitting the same TB. UE1 can transmit different TBs in different sets of three scheduled or indicated PSCCH or PSSCH resources, wherein the different TBs may be for different UEs or same UE. In one embodiment, UE1 may perform logical channel prioritization and generate a TB, wherein the TB comprises sidelink data from at least a logical channel with highest priority among logical channels with available sidelink data. UE1 may determine destination or UE, associated with the generated TB, based on the logical channel with highest priority.
- For a sidelink configured grant type 1, the network node may transmit, to UE, a configuration for sidelink configured grant type 1. The configuration for sidelink configured grant type 1 can schedule or indicate at most three PSCCH or PSSCH resources. The UE receiving the configuration may perform one or more PSCCH or PSSCH transmissions respectively on the scheduled or indicated PSCCH or PSSCH resources, wherein the one or more PSCCH or PSSCH transmission includes, delivers, or comprises the same transport block (TB). Moreover, the UE may determine a resource reservation period associated with the sidelink configured grant type 1. For instance, the configuration for sidelink configured grant type 1 may indicate an associated resource reservation period for the SL configured grant type 1.
- As shown in FIG. 10(c), the UE1 receives a configuration for sidelink configured grant type 1 from network node, wherein the configuration schedules or indicates three PSCCH or PSSCH resources and an associated resource reservation period P. UE1 may derive or determine periodic reserved resources based on the three PSCCH or PSSCH resources and the resource reservation period P. In other words, the three PSCCH or PSSCH resources occur periodically based on the resource reservation period P. These periodically PSCCH or PSSCH resources are transmission opportunities for UE1 to perform sidelink transmissions. As shown in FIG. 10(c), UE1 may perform three PSCCH or PSSCH transmissions respectively on a set of the three scheduled or indicated PSCCH or PSSCH resources in T1, T2, T3, wherein the three PSCCH or PSSCH transmissions includes, delivers, or comprises the same TB1 for UE2. The UE may perform another three PSCCH or PSSCH transmissions respectively on another set of three scheduled or indicated PSCCH or PSSCH resources in T1+P, T2+P, T3+P, wherein the another three PSCCH or PSSCH transmissions includes, delivers, or comprises the same TB2 for UE2 or for another UE. Note that each set of three scheduled or indicated PSCCH or PSSCH resources are utilized for transmitting the same TB. UE1 can transmit different TBs in different sets of three scheduled or indicated PSCCH or PSSCH resources, wherein the different TBs may be for different UEs or same UE. In one embodiment, UE1 may perform logical channel prioritization and generate a TB, wherein the TB comprises sidelink data from at least a logical channel with highest priority among logical channels with available sidelink data.

UE1 may determine destination or UE, associated with the generated TB, based on the logical channel with highest priority.

If UE1 has available sidelink data (before the timing of the first PSCCH or PSSCH resource of one set of PSCCH or PSSCH resources), UE1 may perform three PSCCH or PSSCH transmissions respectively on the three PSCCH or PSSCH resources of the one set, wherein the three PSCCH or PSSCH transmissions includes, delivers, or comprises the same TB1 for a UE, e.g. UE2. Additionally or alternatively, based on R1-2009460, if UE1 has no available sidelink data before the timing of the first PSCCH or PSSCH resource of one set of PSCCH or PSSCH resources and UE1 has available sidelink data before the timing of the second PSCCH or PSSCH resource of the one set, UE1 may perform two PSCCH or PSSCH transmissions respectively on the second and third PSCCH or PSSCH resources of the one set, wherein the two PSCCH or PSSCH transmissions includes, delivers, or comprises the same TB1 for a UE, e.g. UE2 or other UE. UE1 may not perform PSCCH or PSSCH transmission on the first PSCCH or PSSCH resource of the one set, since there is no available sidelink data before the timing of the first PSCCH or PSSCH resource of the one set.

For UE (autonomous) selection mode, e.g. NR sidelink resource allocation mode 2, since transmission resource is not scheduled or indicated via network, the UE may require performing sensing before selecting a resource for transmission (e.g., sensing-based transmission), in order to avoid resource collision and interference from or to other UEs. Currently, full sensing is supported in NR R16 sidelink. Design of Partial sensing is ongoing for NR R17 sidelink. Based on the result of sensing procedure, the UE can determine a valid or identified resource set. The valid or identified resource set may be reported to higher layers (of the UE). The UE may (randomly) select one or multiple valid/identified resources from the valid/identified resource set to perform sidelink transmission(s) from the UE. The sidelink transmission(s) from the UE may be PSCCH and/or PSSCH transmission. Moreover, in sidelink resource allocation mode 2, the UE performs the resource selection, wherein the resource selection may create a selected sidelink grant corresponding to transmission(s) of single TB or may create a selected sidelink grant corresponding to transmissions of multiple TBs:

For a selected sidelink grant corresponding to transmission(s) of single TB, noted as selected sidelink grant for single TB, the UE may select or reserve at most three PSCCH or PSSCH resources. The UE may perform one or more PSCCH or PSSCH transmissions respectively on the selected or reserved PSCCH or PSSCH resources, wherein the one or more PSCCH or PSSCH transmission includes, delivers, or comprises the same transport block (TB).

Figure 11:
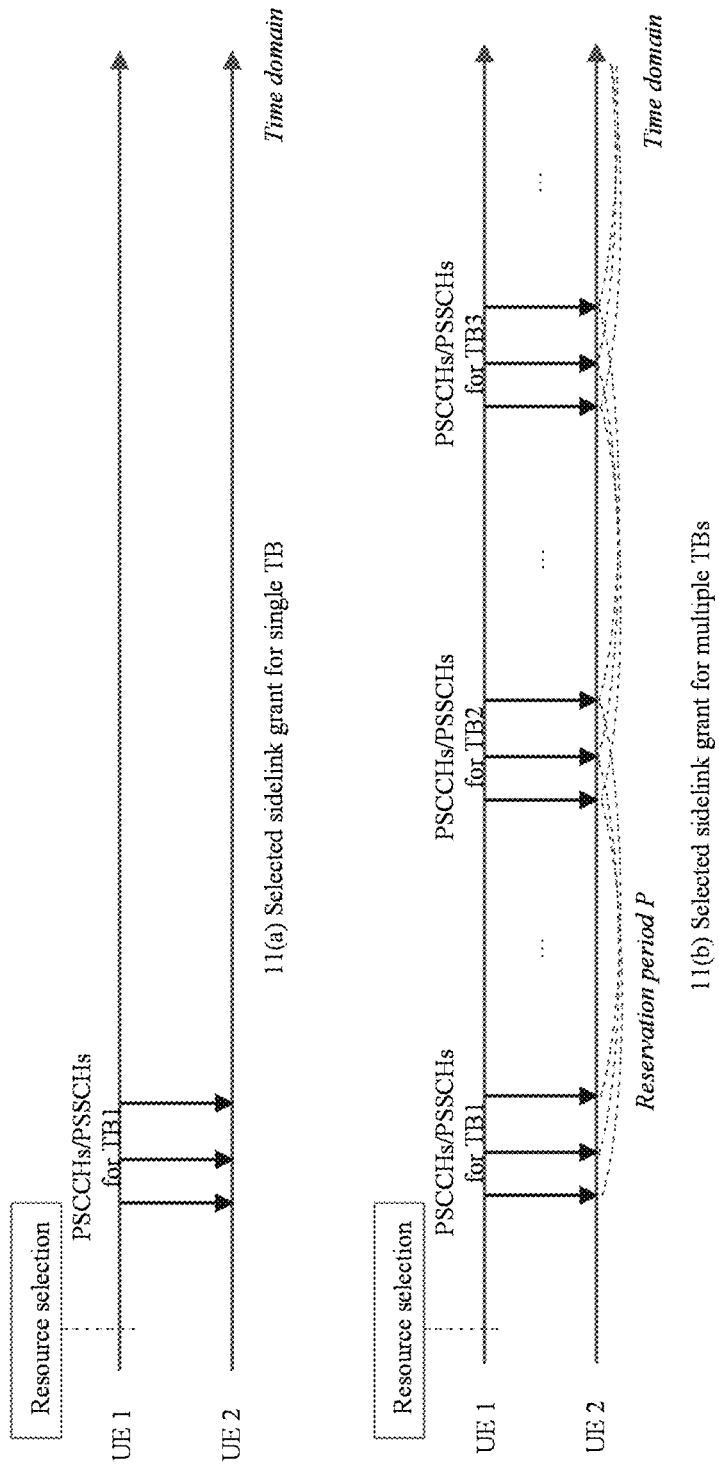
FIG. 11 is a diagram according to one exemplary embodiment.

As instance shown in FIG. 11(a), UE1 performs resource selection to select or reserve three PSCCH or PSSCH resources. When UE1 has available sidelink data, UE1 may perform three PSCCH or PSSCH transmissions respectively on the three selected or reserved PSCCH or PSSCH resources, wherein the three PSCCH or PSSCH transmissions includes, delivers, or comprises the same TB1 for UE2. In one embodiment, UE1 may perform logical channel prioritization and generate TB1, wherein TB1 comprises sidelink data from at least a logical channel with highest priority among logical channels with available sidelink data. UE1 may determine destination or UE, associated with the generated TB1, based on the logical channel with highest priority, e.g. the UE2.

For a selected sidelink grant corresponding to transmission(s) of multiple TBs, noted as selected sidelink grant for multiple TBs, the UE may select or reserve at most three PSCCH or PSSCH resources and determine an associated resource reservation period P. UE1 may derive or determine periodic reserved resources based on the three PSCCH or PSSCH resources and the resource reservation period P. In other words, the three PSCCH or PSSCH resources occur periodically based on the resource reservation period P. These periodically PSCCH or PSSCH resources are transmission opportunities for UE1 to perform sidelink transmissions. As instance shown in FIG. 11(b), UE1 may perform three PSCCH or PSSCH transmissions respectively on a set of the three selected or reserved PSCCH or PSSCH resources in T1, T2, T3, wherein the three PSCCH or PSSCH transmissions includes, delivers, or comprises the same TB1 for UE2. The UE may perform another three PSCCH or PSSCH transmissions respectively on another set of three selected or reserved PSCCH or PSSCH resources in T1+P, T2+P, T3+P, wherein the another three PSCCH or PSSCH transmissions includes, delivers, or comprises the same TB2 for UE2 or for another UE. Note that each set of three selected or reserved PSCCH or PSSCH resources are utilized for transmitting the same TB. UE1 can transmit different TBs in different sets of three selected or reserved PSCCH or PSSCH resources, wherein the different TBs may be for different UEs or same UE. In one embodiment, UE1 may perform logical channel prioritization and generate a TB, wherein the TB comprises sidelink data from at least a logical channel with highest priority among logical channels with available sidelink data. UE1 may determine destination or UE, associated with the generated TB, based on the logical channel with highest priority.

If UE1 has available sidelink data (before the timing of the first PSCCH or PSSCH resource of one set of PSCCH or PSSCH resources), UE1 may perform three PSCCH or PSSCH transmissions respectively on the three PSCCH or PSSCH resources of the one set, wherein the three PSCCH or PSSCH transmissions includes, delivers, or comprises the same TB1 for a UE, e.g. UE2. Additionally or alternatively, if UE1 has no available sidelink data before the timing of the first PSCCH or PSSCH resource of one set of PSCCH or PSSCH resources (and even if UE1 has available sidelink data before the timing of the second PSCCH/PSSCH resource of the one set), UE1 may not perform any PSCCH or PSSCH transmissions on the three PSCCH or PSSCH resources of the one set.

In the Justification and objective of work item for NR Rel-17 V2X (as discussed in 3GPP RP-202846), power saving is one of enhancement to enable UEs with battery constraint to perform sidelink operations in a power efficient manner. To reduce power consumption, it may specify or design partial sensing to Rel-17 NR sidelink resource allocation mode 2. Thus, a UE may perform partial sensing to select sidelink resources, instead of performing full sensing with more power consumption. Note that the partial sensing and resource selection is performed from transmitter aspect of the UE.

In another aspect, work item for NR Rel-17 V2X (as discussed in 3GPP RP-202846) may specify or design sidelink DRX for a UE to reduce power consumption, since the UE operating SL DRX procedure will not need to wake up all the time. It means that the UE will not need to monitor or decode PSCCH and/or PSSCH in all sidelink slots. In one embodiment, the UE may monitor or decode PSCCH and/or PSSCH in sidelink active time. The UE may not monitor or decode PSCCH and/or PSSCH in sidelink non-active time. The DRX procedure in NR Uu may be considered to apply, with some modification, to NR sidelink. In one embodiment, if DRX cycle is introduced for sidelink and/or a DRX on-duration timer for sidelink is introduced, the sidelink active time of the UE may include the time while the DRX on-duration timer for sidelink is running. In one embodiment, if a DRX Inactivity timer for sidelink is introduced, the sidelink active time of the UE may include the time while the DRX Inactivity timer for sidelink is running. In one embodiment, if a DRX retransmission timer for sidelink is introduced, the sidelink active time of the UE may include the time while the DRX retransmission timer for sidelink is running. In one embodiment, the sidelink active time of the UE may include the time while any of the DRX on-duration timer for sidelink, the DRX Inactivity timer for sidelink, or the DRX retransmission timer for sidelink is running. Note that the sidelink DRX is performed from receiver aspect of the UE.

Figure 12:
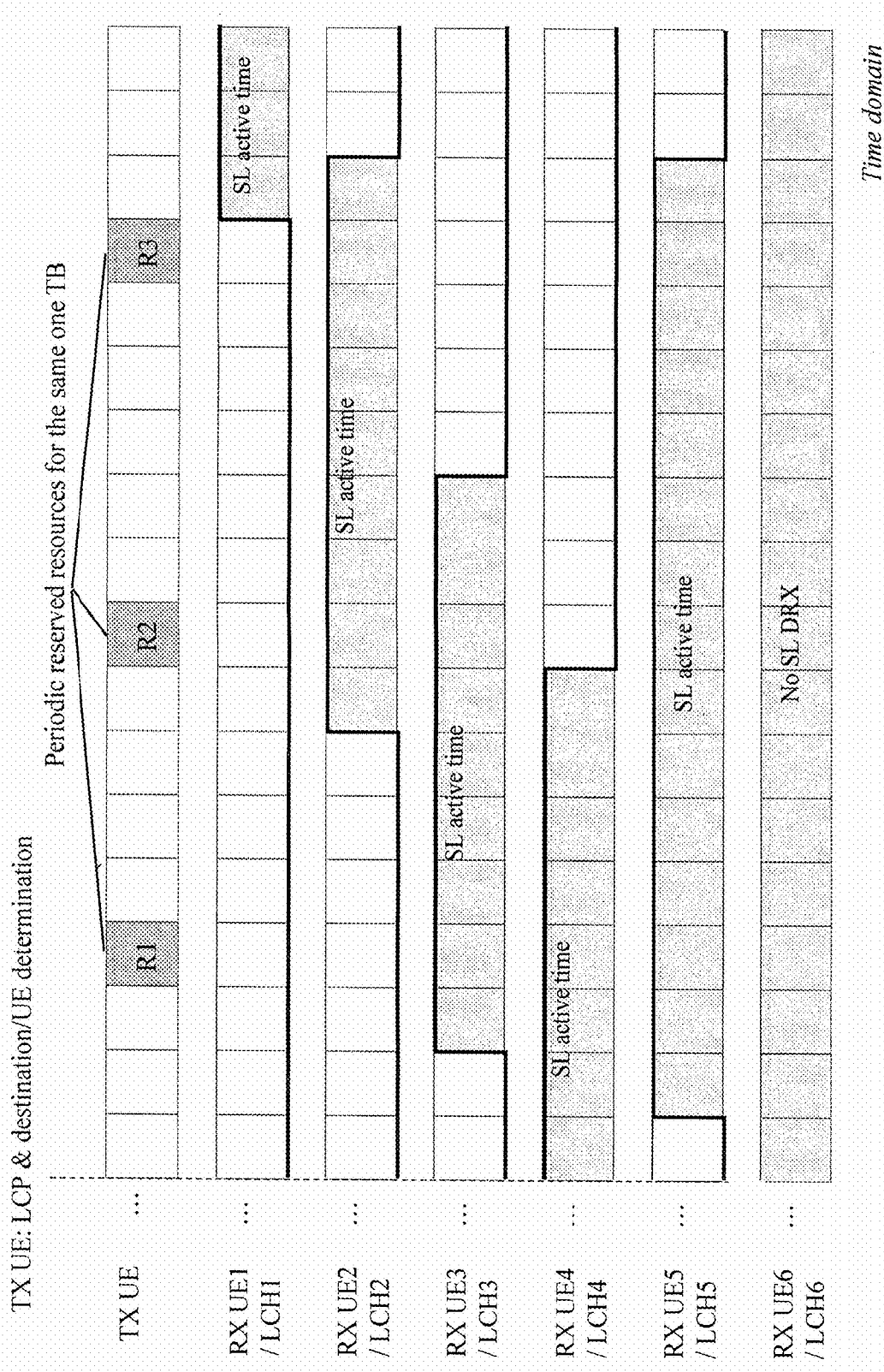
FIG. 12 is a diagram according to one exemplary embodiment.

Although sidelink DRX is able to reduce power consumption for a UE, it may mean that the UE will not monitor or decode PSCCH in sidelink non-active time. Accordingly, the UE will not receive PSCCH or SCI from other UE(s) in the sidelink non-active time. If a TX UE wants to transmit a TB to a RX UE operating SL DRX procedure, one possible way is to ensure that the sidelink transmission (e.g. initial sidelink transmission of the TB) from the TX UE is transmitted within sidelink active time of the RX UE. From another aspect, when the TX UE generates a TB and determines destination or UE accordingly, the TX UE may need to consider sidelink active time of possible destinations or UEs. However, each destination or UE may have its own sidelink DRX pattern or configuration. As shown in FIG. 12, the TX UE may have available sidelink data respectively for RX UE 1~4, wherein the sidelink data for each RX UE may have different or the same priority. Moreover, the RX UE 1~4 may have respective sidelink DRX pattern or configuration, thus sidelink active time of the RX UE 1~4 may be different. In other words, the sidelink active time of the RX UE 1~4 may not align in time domain. In such case, for using the periodic reserved resources for same one TB (e.g. PSCCH or PSSCH resource(s) reserved by sidelink configured grant type 1, sidelink configured grant type 2, or selected sidelink grant corresponding to transmission(s) of multiple TBs), it is questionable that how the TX UE generates the TB (e.g. how to perform logical channel prioritization) and determines destination or UE of the TB.

To deal with these issues, some mechanisms/methods/embodiments are provided below.

Assuming a first UE may have periodic sidelink resource reservation. The periodic sidelink resource reservation may be utilized for sidelink transmissions of multiple data packets from the first UE. In one embodiment, the periodic sidelink resource reservation may mean or comprise that a set of sidelink resources are periodically reserved for the first UE. For one set of sidelink resources, the first UE may generate a first data packet.

In one embodiment, the first UE may have one or more sidelink logical channels with available sidelink data (for transmission). Each of the one or more sidelink logical channels may be associated with a destination or UE. (For generating the first data packet) the UE may determine or derive a set of sidelink logical channels among or from the one or more sidelink logical channels with available sidelink data (for transmission), and the first UE may perform sidelink logical channel prioritization among the set of the sidelink logical channels (e.g. a set or subset of the one or more sidelink logical channels). In one embodiment, the sidelink logical channel prioritization may mean that the first UE may select or determine a sidelink logical channel with highest priority among the set of sidelink logical channels. In one embodiment, the sidelink logical channel prioritization may mean that the first UE may select or determine a destination associated with a sidelink logical channel with highest priority among the set of sidelink logical channels.

In one embodiment, (when generating the first data packet) the first UE may comprise, include, or multiplex available sidelink data on the selected or determined sidelink logical channel in the first data packet. In one embodiment, the first UE may set, determine, or select a destination or UE of the first data packet based on the selected or determined sidelink logical channel. In one embodiment, the first UE may set, determine, or select the destination of the first data packet as a first destination, wherein the first destination is associated with the selected or determined sidelink logical channel.

Method a

The general concept of method a is that the first UE (generates the first data packet and) determines, derives, or selects the destination or UE based on (at least) any of the one set of sidelink resources and sidelink DRX configurations, parameters, or patterns of one or more destinations or UEs associated with the one or more sidelink logical channels. In one embodiment, the first UE may determine or derive the set of sidelink logical channels based on any of the one set of sidelink resources and sidelink DRX configurations, parameters, or patterns of one or more destinations or UEs associated with the one or more sidelink logical channels. Additionally or alternatively, the first UE may determine or derive the set of sidelink logical channels based on any of the one set of sidelink resources and sidelink DRX configurations, parameters, or patterns associated with the one or more sidelink logical channels.

In one embodiment, the first UE determines or derives the set of sidelink logical channels based on a condition that in the timing(s) of any of the one set of sidelink resources, whether/which destination(s)/UE(s), among the one or more destinations or UEs associated with the one or more sidelink logical channels, is/are in sidelink active time. More specifically, in the timing(s) of any of the one set of sidelink resources, if a destination or UE, among the one or more destinations or UEs associated with the one or more sidelink logical channels, is in sidelink active time, the first UE determines a logical channel associated with the destination or UE as being in the set of sidelink logical channels. In the timing(s) of all of the one set of sidelink resources, if a destination or UE, among the one or more destinations or UEs associated with the one or more sidelink logical channels, is not in sidelink active time, the first UE determines a logical channel associated with the destination or UE as not being in the set of sidelink logical channels.

In one embodiment, the first UE determines or derives the set of sidelink logical channels based on a condition that (the timing(s) of) any of the one set of sidelink resources is in which destination(s)/UE(s)'s sidelink active time(s), among the one or more destinations or UEs associated with the one or more sidelink logical channels. More specifically, if (the timing(s) of) any of the one set of sidelink resources is in sidelink active time of a destination or UE, among the one or more destinations or UEs associated with the one or more sidelink logical channels, a sidelink logical channel associated with the destination or UE is considered or determined in the set of sidelink logical channels. If (the timing(s) of) all of the one set of sidelink resources are not in sidelink active time of a destination or UE, among the one or more destinations or UEs associated with the one or more sidelink logical channels, a sidelink logical channel associated with the destination or UE is not considered or determined in the set of sidelink logical channels.

In one embodiment, the first UE determines or derives the set of sidelink logical channels based on a condition that (the timing(s) of) any of the one set of sidelink resources is in which sidelink active time(s) associated with the one or more sidelink logical channels. More specifically, if (the timing(s) of) any of the one set of sidelink resources is in sidelink active time associated with a sidelink logical channel, among the one or more sidelink logical channels, the sidelink logical channel is considered or determined in the set of sidelink logical channels. If (the timing(s) of) all of the one set of sidelink resources are not in sidelink active time associated with a sidelink logical channel, among the one or more sidelink logical channels, the sidelink logical channel is not considered or determined in the set of sidelink logical channels.

In one embodiment, the first UE determines or derives the set of sidelink logical channels based on a condition that which destination(s)/UE(s)'s sidelink active time(s), among the one or more destinations or UEs associated with the one or more sidelink logical channels, comprises or includes (the timing(s) of) any of the one set of sidelink resources. More specifically, if sidelink active time associated with a destination or UE, among the one or more destination(s) or UE(s), comprises or includes (the timing(s) of) any of the one set of sidelink resources, a sidelink logical channel associated with the destination or UE is considered or determined in the set of sidelink logical channels. If sidelink active time associated with a destination or UE, among the one or more destination(s) or UE(s), does not comprise or include (the timing(s) of) any of the one set of sidelink resources, a sidelink logical channel associated with the destination or UE is not considered or determined in the set of sidelink logical channels.

In one embodiment, the first UE determines or derives the set of sidelink logical channels based on a condition that which sidelink active time(s) associated with the one or more sidelink logical channels comprises or includes (the timing(s) of) any of the one set of sidelink resources. More specifically, if sidelink active time associated with a sidelink logical channel, among the one or more sidelink logical channels, comprises or includes (the timing(s) of) any of the one set of sidelink resources, the sidelink logical channel is considered or determined in the set of sidelink logical channels. If sidelink active time associated with a sidelink logical channel, among the one or more sidelink logical channels, does not comprise or include (the timing(s) of) any of the one set of sidelink resources, the sidelink logical channel is not considered/determined in the set of sidelink logical channels.

As shown in FIG. 12, the TX UE with periodic resource reservation may have a set of reserved sidelink resources R1, R2, R3 in one period, which can be used for sidelink transmissions of the same one TB. Note that FIG. 12 mainly considers timing relationship in time domain and does not consider frequency domain. The sidelink resources R1, R2, R3 may be different in frequency domain, e.g. staring Physical Resource Block (PRB) or subchannel of the sidelink resources R1, R2, R3 may be different in frequency domain. The sidelink resources R1, R2, R3 may be within the same sidelink resource pool.

As shown in FIG. 12, the TX UE may perform logical channel prioritization and determine, derive, or select a destination or UE before the timing of sidelink resource R1. The TX UE may derive or know sidelink active time of RX UE1~RX UE5 or LCH1~LCH5, based on associated sidelink DRX configurations, parameters, or patterns. For instance, the TX UE may derive, know, expect, or assume sidelink active time of RX UE1~RX UE5 or LCH1~LCH5, based on associated sidelink onduration timer being running. The TX UE may not have sidelink DRX configurations, parameters, or patterns for RX UE6 or LCH6. Note that the LCH1~LCH6 are sidelink logical channels, of the TX UE, with available sidelink data.

Since sidelink active time of RX UE1 or LCH1 does not comprise any timing of the sidelink resources R1, R2, R3, the TX UE will not consider LCH1 or RX UE1 for performing logical channel prioritization and/or destination/UE determination or selection.

Since sidelink active time of RX UE2 or LCH2 comprises timing of the sidelink resources R2, R3, the TX UE will consider LCH2 or RX UE2 for performing logical channel prioritization and/or destination/UE determination or selection.

Since sidelink active time of RX UE3 or LCH3 comprises timing of the sidelink resources R1, R2, the TX UE will consider LCH3 or RX UE3 for performing logical channel prioritization and/or destination/UE determination or selection.

Since sidelink active time of RX UE4 or LCH4 comprises timing of the sidelink resources R1, the TX UE will consider LCH4 or RX UE4 for performing logical channel prioritization and/or destination/UE determination or selection.

Since sidelink active time of RX UE5 or LCH5 comprises timing of the sidelink resources R1, R2, R3, the TX UE will consider LCH5 or RX UE5 for performing logical channel prioritization and destination/UE determination or selection.

Since there is no SL DRX for RX UE6 or LCH6, the TX UE will consider LCH6 or RX UE6 for performing logical channel prioritization and destination/UE determination or selection.

Thus, the TX UE may perform logical channel prioritization among LCH2~6, and determine or select a destination or UE accordingly.

For instance, if LCH3 is with highest priority among LCH2~6, the TX UE may generate a data packet comprising (at least) sidelink data on (or associated with) the LCH3, wherein the destination or UE of the data packet is UE3. The TX UE may perform three PSCCH or PSSCH transmissions respectively on the sidelink resources R1, R2, R3. The PSCCH or PSSCH transmission on the sidelink resource R1 may be initial sidelink transmission of the data packet. The RV may be set to zero for the PSCCH or PSSCH transmission on the sidelink resource R1. The PSCCH or PSSCH transmissions on the sidelink resources R2 and R3 may be sidelink retransmissions of the data packet. The RV may be set to non-zero for the PSCCH or PSSCH transmissions on the sidelink resources R2 and R3. In one embodiment, the TX UE may expect or assume sidelink inactivity timer of the RX UE3 will (re)start in response to PSCCH or PSSCH transmission on the sidelink resource R1. The sidelink active time of RX UE3 may extend because RX UE3's sidelink inactivity timer is running.

For instance, if LCH2 is with highest priority among LCH2~6, the TX UE may generate a data packet comprising sidelink data on the LCH2, wherein the destination or UE of the data packet is UE2.

In one alternative, the TX UE may perform two PSCCH or PSSCH transmissions respectively on the sidelink resources R2, R3. In one embodiment, the TX UE may not perform PSCCH or PSSCH transmission on the sidelink resources R1. The TX UE may drop PSCCH or PSSCH transmission on the sidelink resources R1. This alternative considers that RX UE2 may be not in sidelink active time and may not be able to receive sidelink transmission on the resource R1. The PSCCH or PSSCH transmission on the sidelink resource R2 may be initial sidelink transmission of the data packet. The RV may be set to zero for the PSCCH or PSSCH transmission on the sidelink resource R2. The PSCCH or PSSCH transmission on the sidelink resource R3 may be sidelink retransmission of the data packet. The RV may be set to non-zero for the PSCCH/PSSCH transmission on the sidelink resource R3.

In another alternative, the TX UE may perform three PSCCH or PSSCH transmissions respectively on the sidelink resources R1, R2, R3. This alternative considers that RX UE2 may be possible to receive sidelink transmission on the resource R1, e.g. RX UE2 may still monitor Sidelink Control Information (SCI) or PSCCH due to other possible sidelink active time associated with other TX UE. The PSCCH or PSSCH transmission on the sidelink resource R3 may be sidelink retransmission of the data packet. The RV may be set to non-zero for the PSCCH or PSSCH transmission on the sidelink resource R3. In one embodiment, the PSCCH or PSSCH transmission on the sidelink resource R2 may be sidelink retransmission of the data packet. The RV may be set to non-zero for the PSCCH or PSSCH transmission on the sidelink resource R2. The PSCCH or PSSCH transmission on the sidelink resource R1 may be initial sidelink transmission of the data packet. The RV may be set to zero for the PSCCH or PSSCH transmission on the sidelink resource R1. Alternatively, the PSCCH or PSSCH transmission on the sidelink resource R2 may be initial sidelink transmission of the data packet. The RV may be set to zero for the PSCCH or PSSCH transmission on the sidelink resource R2. The PSCCH or PSSCH transmission on the sidelink resource R1 may be (considered as) initial sidelink transmission of the data packet or may be sidelink retransmission of the data packet. The RV may be set to zero or set to non-zero for the PSCCH or PSSCH transmission on the sidelink resource R1.

For one instance, if LCH2 and LCH3 are both with highest priority among LCH2~6, the TX UE may select or determine one LCH, from LCH2 and LCH3, to generate a data packet comprising sidelink data on the one LCH, wherein the destination or UE of the data packet is associated with the one LCH. In one embodiment, the one LCH selection or determination from LCH2 and LCH3 may be TX UE implementation. Additionally or alternatively, the TX UE may select or determine the one LCH, from LCH2 and LCH3, with shorter remaining packet delay budget. Additionally or alternatively, the TX UE may select or determine the one LCH, from LCH2 and LCH3, with earlier sidelink active time (among the timings of the sidelink resources R1, R2, R3), e.g. select or determine the LCH 3. Additionally or alternatively, the TX UE may select or determine the one LCH, from LCH2 and LCH3, with more resource utilization among the timings of the sidelink resources R1, R2, R3, e.g. select or determine the LCH 3. Additionally or alternatively, the TX UE may select or determine the one LCH, from LCH2 and LCH3, based on cast-type associated with LCH2 and LCH3, such as preferentially select or determine groupcast or preferentially select or determine unicast. Additionally or alternatively, the TX UE may select or determine the one LCH based on whether SL DRX is supported. Such as for another case, if LCH2 and LCH6 are both with highest priority, the TX UE preferentially select or determine LCH2 with SL DRX.

Method b

The general concept of method b is that the first UE (generates the first data packet and) determines, derives, or selects the destination or UE based on the first sidelink resource of the one set of sidelink resources and sidelink DRX configurations, parameters, or patterns of one or more destinations or UEs associated with the one or more sidelink logical channels. In one embodiment, the first UE may determine or derive the set of sidelink logical channels based on (at least) the first sidelink resource of the one set of sidelink resources and sidelink DRX configurations, parameters, or patterns of one or more destinations or UEs associated with the one or more sidelink logical channels. The first sidelink resource may mean the earliest sidelink resource, in time domain, among the one set of sidelink resources. Additionally or alternatively, the first UE may determine or derive the set of sidelink logical channels based on the first sidelink resource of the one set of sidelink resources and sidelink DRX configurations, parameters, or patterns associated with the one or more sidelink logical channels.

In one embodiment, the first UE determines or derives the set of sidelink logical channels based on a condition that in the timing of the first sidelink resource of the one set of sidelink resources, whether/which destination(s) or UE(s), among the one or more destinations or UEs associated with the one or more sidelink logical channels, is/are in sidelink active time. More specifically, in the timing of the first sidelink resource of the one set of sidelink resources, if a destination or UE, among the one or more destinations or UEs associated with the one or more sidelink logical channels, is in sidelink active time, the first UE determines a logical channel associated with the destination or UE as being in the set of sidelink logical channels. In the timing of the first sidelink resource of the one set of sidelink resources, if a destination or UE, among the one or more destinations or UEs associated with the one or more sidelink logical channels, is not in sidelink active time, the first UE determines a logical channel associated with the destination or UE as not being in the set of sidelink logical channels.

In one embodiment, the first UE determines or derives the set of sidelink logical channels based on a condition that (the timing of) the first sidelink resource of the one set of sidelink resources is in which destination(s)/UE(s)'s sidelink active time(s), among the one or more destinations/UEs associated with the one or more sidelink logical channels. More specifically, if (the timing of) the first sidelink resource of the one set of sidelink resources is in sidelink active time of a destination or UE, among the one or more destinations or UEs associated with the one or more sidelink logical channels, a sidelink logical channel associated with the destination or UE is considered or determined in the set of sidelink logical channels. If (the timing of) the first sidelink resource of the one set of sidelink resources is not in sidelink active time of a destination or UE, among the one or more destinations or UEs associated with the one or more sidelink logical channels, a sidelink logical channel associated with the destination/UE is not considered or determined in the set of sidelink logical channels.

In one embodiment, the first UE determines or derives the set of sidelink logical channels based on a condition that (the timing of) the first sidelink resource of the one set of sidelink resources is in which sidelink active time(s) associated with the one or more sidelink logical channels. More specifically, if (the timing of) the first sidelink resource of the one set of sidelink resources is in sidelink active time associated with a sidelink logical channel, among the one or more sidelink logical channels, the sidelink logical channel is considered or determined in the set of sidelink logical channels. If (the timing of) the first sidelink resource of the one set of sidelink resources is not in sidelink active time associated with a sidelink logical channel, among the one or more sidelink logical channels, the sidelink logical channel is not considered or determined in the set of sidelink logical channels.

In one embodiment, the first UE determines or derives the set of sidelink logical channels based on a condition that which destination(s)/UE(s)'s sidelink active time(s), among the one or more destinations or UEs associated with the one or more sidelink logical channels, comprises or includes (the timing of) the first sidelink resource of the one set of sidelink resources. More specifically, if sidelink active time associated with a destination or UE, among the one or more destination(s) or UE(s), comprises or includes (the timing of) the first sidelink resource of the one set of sidelink resources, a sidelink logical channel associated with the destination or UE is considered or determined in the set of sidelink logical channels. If sidelink active time associated with a destination or UE, among the one or more destination(s) or UE(s), does not comprise or include (the timing of) the first sidelink resource of the one set of sidelink resources, a sidelink logical channel associated with the destination or UE is not considered or determined in the set of sidelink logical channels.

In one embodiment, the first UE determines or derives the set of sidelink logical channels based on a condition that which sidelink active time(s) associated with the one or more sidelink logical channels comprises or includes (the timing of) the first sidelink resource of the one set of sidelink resources. More specifically, if sidelink active time associated with a sidelink logical channel, among the one or more sidelink logical channels, comprises or includes (the timing of) the first sidelink resource of the one set of sidelink resources, the sidelink logical channel is considered or determined in the set of sidelink logical channels. If sidelink active time associated with a sidelink logical channel, among the one or more sidelink logical channels, does not comprise or include (the timing of) the first sidelink resource of the one set of sidelink resources, the sidelink logical channel is not considered/determined in the set of sidelink logical channels.

In one embodiment, the first UE does not determine or derive the destination/UE based on the second or the third sidelink resource of the one set of sidelink resources and sidelink DRX configurations, parameters, or patterns of one or more destinations or UEs associated with the one or more sidelink logical channels. The second sidelink resource may mean the second earliest (or the last if there are two sidelink resources in the one set) sidelink resource, in time domain, among the one set of sidelink resources. The third sidelink resource may mean the third earliest or the last sidelink resource (if there are three sidelink resources in the one set) sidelink resource, in time domain, among the one set of sidelink resources. In one embodiment, the first UE may not determine or derive the set of sidelink logical channels based on the second or the third sidelink resource of the one set of sidelink resources and sidelink DRX configurations, parameters, or patterns of one or more destinations or UEs associated with the one or more sidelink logical channels. Additionally or alternatively, the first UE may not determine or derive the set of sidelink logical channels based on the second or the third sidelink resource of the one set of sidelink resources and sidelink DRX configurations, parameters, or patterns associated with the one or more sidelink logical channels.

As shown in FIG. 12, the TX UE with periodic resource reservation may have a set of reserved sidelink resources R1, R2, R3 in one period, which can be used for sidelink transmissions of the same one TB. Note that FIG. 12 mainly considers timing relationship in time domain and does not consider frequency domain. The sidelink resources R1, R2, R3 may be different in frequency domain, e.g. staring PRB or subchannel of the sidelink resources R1, R2, R3 may be different in frequency domain. The sidelink resources R1, R2, R3 may be within the same sidelink resource pool.

As shown in FIG. 12, the TX UE may perform logical channel prioritization and determine, derive, or select a destination or UE before the timing of sidelink resource R1. The TX UE may derive or know sidelink active time of RX UE1~RX UE5 or LCH1~LCH5, based on associated sidelink DRX configurations, parameters, or patterns. For instance, the TX UE may derive, know, expect, or assume sidelink active time of RX UE1~RX UE5 or LCH1~LCH5, based on associated sidelink onduration timer being running. The TX UE may not have sidelink DRX configurations, parameters, or patterns for RX UE6 or LCH6. Note that the LCH1~LCH6 are sidelink logical channels, of the TX UE, with available sidelink data.

Since sidelink active time of RX UE1 or LCH1 does not comprise timing of the sidelink resources R1, the TX UE will not consider LCH1 or RX UE1 for performing logical channel prioritization and/or destination/UE determination or selection.

Since sidelink active time of RX UE2 or LCH2 does not comprise the sidelink resources R1, the TX UE will not consider LCH2 or RX UE2 for performing logical channel prioritization and/or destination/UE determination or selection.

Since sidelink active time of RX UE3 or LCH3 comprises timing of the sidelink resources R1, the TX UE will consider LCH3 or RX UE3 for performing logical channel prioritization and/or destination/UE determination or selection.

Since sidelink active time of RX UE4 or LCH4 comprises timing of the sidelink resources R1, the TX UE will consider LCH4 or RX UE4 for performing logical channel prioritization and/or destination/UE determination or selection.

Since sidelink active time of RX UE5 or LCH5 comprises timing of the sidelink resources R1, the TX UE will consider LCH5 or RX UE5 for performing logical channel prioritization and/or destination/UE determination or selection.

Since there is no SL DRX for RX UE6 or LCH6, the TX UE will consider LCH6 or RX UE6 for performing logical channel prioritization and/or destination/UE determination or selection.

Thus, the TX UE may perform logical channel prioritization among LCH3~6, and determine or select a destination or UE accordingly.

For one instance, if LCH3 is with highest priority among LCH3~6, the TX UE may generate a data packet comprising (at least) sidelink data on (or associated with) the LCH3, wherein the destination or UE of the data packet is UE3. The TX UE may perform three PSCCH or PSSCH transmissions respectively on the sidelink resources R1, R2, R3. The PSCCH or PSSCH transmission on the sidelink resource R1 may be initial sidelink transmission of the data packet. The RV may be set to zero for the PSCCH or PSSCH transmission on the sidelink resource R1. The PSCCH or PSSCH transmissions on the sidelink resources R2 and R3 may be sidelink retransmissions of the data packet. The RV may be set to non-zero for the PSCCH or PSSCH transmissions on the sidelink resources R2 and R3. In one embodiment, the TX UE may expect or assume sidelink inactivity timer of the RX UE3 will (re)start in response to PSCCH or PSSCH transmission on the sidelink resource R1. The sidelink active time of RX UE3 may extend because RX UE3's sidelink inactivity timer is running.

For instance, if LCH4 and LCH3 are both with highest priority among LCH3~6, the TX UE may select or determine one LCH, from LCH4 and LCH3, to generate a data packet comprising sidelink data on the one LCH, wherein the destination or UE of the data packet is associated with the one LCH. In one embodiment, the one LCH selection or determination from LCH4 and LCH3 may be TX UE implementation. Additionally or alternatively, the TX UE may select or determine the one LCH, from LCH4 and LCH3, with shorter remaining packet delay budget. Additionally or alternatively, the TX UE may select or determine the one LCH, from LCH4 and LCH3, based on cast-type associated with LCH4 and LCH3, such as preferentially select or determine groupcast or preferentially select or determine unicast. Additionally or alternatively, the TX UE may select or determine the one LCH based on whether SL DRX is supported. Such as for another case, if LCH3 and LCH6 are both with highest priority, the TX UE preferentially select/determine LCH3 with SL DRX.

Method c

The general concept of method c is that the first UE (generates the first data packet and) determines, derives, or selects the destination or UE based on the most recent sidelink resource of the one set of sidelink resources and sidelink DRX configurations, parameters, or patterns of one or more destinations or UEs associated with the one or more sidelink logical channels. In one embodiment, the first UE may determine or derive the set of sidelink logical channels based on (at least) the most recent sidelink resource of the one set of sidelink resources and sidelink DRX configurations, parameters, or patterns of one or more destinations or UEs associated with the one or more sidelink logical channels. The most recent sidelink resource may mean the earliest sidelink resource, in time domain, among the one set of sidelink resources when the first UE (is going to) generate the first data packet or perform logical channel prioritization or determine destination or UE. Additionally or alternatively, the first UE may determine or derive the set of sidelink logical channels based on the most recent sidelink resource of the one set of sidelink resources and sidelink DRX configurations, parameters, or patterns associated with the one or more sidelink logical channels.

In one embodiment, the first UE determines or derives the set of sidelink logical channels based on a condition that in the timing of the most recent sidelink resource of the one set of sidelink resources, whether/which destination(s) or UE(s), among the one or more destinations or UEs associated with the one or more sidelink logical channels, is/are in sidelink active time. More specifically, in the timing of the most recent sidelink resource of the one set of sidelink resources, if a destination or UE, among the one or more destinations or UEs associated with the one or more sidelink logical channels, is in sidelink active time, the first UE determines a logical channel associated with the destination or UE as being in the set of sidelink logical channels. In the timing of the most recent sidelink resource of the one set of sidelink resources, if a destination or UE, among the one or more destinations or UEs associated with the one or more sidelink logical channels, is not in sidelink active time, the first UE determines a logical channel associated with the destination or UE as not being in the set of sidelink logical channels.

In one embodiment, the first UE determines or derives the set of sidelink logical channels based on a condition that (the timing of) the most recent sidelink resource of the one set of sidelink resources is in which destination(s)/UE(s)'s sidelink active time(s), among the one or more destinations or UEs associated with the one or more sidelink logical channels. More specifically, if (the timing of) the most recent sidelink resource of the one set of sidelink resources is in sidelink active time of a destination or UE, among the one or more destinations or UEs associated with the one or more sidelink logical channels, a sidelink logical channel associated with the destination or UE is considered or determined in the set of sidelink logical channels. If (the timing of) the most recent sidelink resource of the one set of sidelink resources is not in sidelink active time of a destination or UE, among the one or more destinations or UEs associated with the one or more sidelink logical channels, a sidelink logical channel associated with the destination or UE is not considered or determined in the set of sidelink logical channels.

In one embodiment, the first UE determines or derives the set of sidelink logical channels based on a condition that (the timing of) the most recent sidelink resource of the one set of sidelink resources is in which sidelink active time(s) associated with the one or more sidelink logical channels. More specifically, if (the timing of) the most recent sidelink resource of the one set of sidelink resources is in sidelink active time associated with a sidelink logical channel, among the one or more sidelink logical channels, the sidelink logical channel is considered or determined in the set of sidelink logical channels. If (the timing of) the most recent sidelink resource of the one set of sidelink resources is not in sidelink active time associated with a sidelink logical channel, among the one or more sidelink logical channels, the sidelink logical channel is not considered/determined in the set of sidelink logical channels.

In one embodiment, the first UE determines or derives the set of sidelink logical channels based on a condition that which destination(s)/UE(s)'s sidelink active time(s), among the one or more destinations/UEs associated with the one or more sidelink logical channels, comprises or includes (the timing of) the most recent sidelink resource of the one set of sidelink resources. More specifically, if sidelink active time associated with a destination or UE, among the one or more destination(s) or UE(s), comprises or includes (the timing of) the most recent sidelink resource of the one set of sidelink resources, a sidelink logical channel associated with the destination or UE is considered or determined in the set of sidelink logical channels. If sidelink active time associated with a destination or UE, among the one or more destination(s) or UE(s), does not comprise or include (the timing of) the most recent sidelink resource of the one set of sidelink resources, a sidelink logical channel associated with the destination or UE is not considered or determined in the set of sidelink logical channels.

In one embodiment, the first UE determines or derives the set of sidelink logical channels based on a condition that which sidelink active time(s) associated with the one or more sidelink logical channels comprises or includes (the timing of) the most recent sidelink resource of the one set of sidelink resources. More specifically, if sidelink active time associated with a sidelink logical channel, among the one or more sidelink logical channels, comprises or includes (the timing of) the most recent sidelink resource of the one set of sidelink resources, the sidelink logical channel is considered or determined in the set of sidelink logical channels. If sidelink active time associated with a sidelink logical channel, among the one or more sidelink logical channels, does not comprise or include (the timing of) the most recent sidelink resource of the one set of sidelink resources, the sidelink logical channel is not considered or determined in the set of sidelink logical channels.

In one embodiment, the first UE does not determine or derive the destination or UE based on a sidelink resource, of the one set of sidelink resources, later than the most recent sidelink resource and sidelink DRX configurations, parameters, or patterns of one or more destinations or UEs associated with the one or more sidelink logical channels. For instance, if the most recent sidelink resource is the first sidelink resource of the one set, the sidelink resource later than the most recent sidelink resource may mean the second or the third sidelink resource of the one set. For instance, if the most recent sidelink resource is the second sidelink resource of the one set, the sidelink resource later than the most recent sidelink resource may mean the third sidelink resource of the one set. The first sidelink resource may mean the earliest sidelink resource, in time domain, among the one set of sidelink resources. The second sidelink resource may mean the second earliest (or the last if there are two sidelink resources in the one set) sidelink resource, in time domain, among the one set of sidelink resources. The third sidelink resource may mean the third earliest or the last sidelink resource (if there are three sidelink resources in the one set) sidelink resource, in time domain, among the one set of sidelink resources. In one embodiment, the first UE may not determine or derive the set of sidelink logical channels based on the sidelink resource, of the one set of sidelink resources, later than the most recent sidelink resource and sidelink DRX configurations, parameters, or patterns of one or more destinations or UEs associated with the one or more sidelink logical channels. Additionally or alternatively, the first UE may not determine or derive the set of sidelink logical channels based on the sidelink resource, of the one set of sidelink resources, later than the most recent sidelink resource and sidelink DRX configurations, parameters, or patterns associated with the one or more sidelink logical channels.

As shown in FIG. 12, the TX UE with periodic resource reservation may have a set of reserved sidelink resources R1, R2, R3 in one period, which can be used for sidelink transmissions of the same one TB. Note that FIG. 12 mainly considers timing relationship in time domain and does not consider frequency domain. The sidelink resources R1, R2, R3 may be different in frequency domain, e.g. staring PRB or subchannel of the sidelink resources R1, R2, R3 may be different in frequency domain. The sidelink resources R1, R2, R3 may be within the same sidelink resource pool.

As shown in FIG. 12, the TX UE may perform logical channel prioritization and determine, derive, or select a destination or UE before the timing of sidelink resource R1. The most recent sidelink resource is R1. The TX UE may derive or know sidelink active time of RX UE1~RX UE5 or LCH1~LCH5, based on associated sidelink DRX configurations, parameters, or patterns. For instance, the TX UE may derive, know, expect, or assume sidelink active time of RX UE1~RX UE5 or LCH1~LCH5, based on associated sidelink on-duration timer being running. The TX UE may not have sidelink DRX configurations, parameters, or patterns for RX UE6 or LCH6. Note that the LCH1~LCH6 are sidelink logical channels, of the TX UE, with available sidelink data.

Since sidelink active time of RX UE1 or LCH1 does not comprise timing of the sidelink resources R1, the TX UE will not consider LCH1 or RX UE1 for performing logical channel prioritization and/or destination/UE determination or selection.

Since sidelink active time of RX UE2 or LCH2 does not comprise the sidelink resources R1, the TX UE will not consider LCH2 or RX UE2 for performing logical channel prioritization and/or destination/UE determination or selection.

Since sidelink active time of RX UE3 or LCH3 comprises timing of the sidelink resources R1, the TX UE will consider LCH3 or RX UE3 for performing logical channel prioritization and/or destination/UE determination or selection.

Since sidelink active time of RX UE4 or LCH4 comprises timing of the sidelink resources R1, the TX UE will consider LCH4 or RX UE4 for performing logical channel prioritization and destination/UE determination or selection.

Since sidelink active time of RX UE5 or LCH5 comprises timing of the sidelink resources R1, the TX UE will consider LCH5 or RX UE5 for performing logical channel prioritization and/or destination/UE determination or selection.

Since there is no SL DRX for RX UE6 or LCH6, the TX UE will consider LCH6 or RX UE6 for performing logical channel prioritization and/or destination/UE determination or selection.

Thus, the TX UE may perform logical channel prioritization among LCH3~6, and determine or select a destination or UE accordingly.

For instance, if LCH3 is with highest priority among LCH3~6, the TX UE may generate a data packet comprising (at least) sidelink data on (or associated with) the LCH3, wherein the destination or UE of the data packet is UE3. The TX UE may perform three PSCCH or PSSCH transmissions respectively on the sidelink resources R1, R2, R3. The PSCCH or PSSCH transmission on the sidelink resource R1 may be initial sidelink transmission of the data packet. The RV may be set to zero for the PSCCH or PSSCH transmission on the sidelink resource R1. The PSCCH or PSSCH transmissions on the sidelink resources R2 and R3 may be sidelink retransmissions of the data packet. The RV may be set to non-zero for the PSCCH or PSSCH transmissions on the sidelink resources R2 and R3. In one embodiment, the TX UE may expect or assume sidelink inactivity timer of the RX UE3 will (re)start in response to PSCCH or PSSCH transmission on the sidelink resource R1. The sidelink active time of RX UE3 may extend because RX UE3's sidelink inactivity timer is running.

For instance, if LCH4 and LCH3 are both with highest priority among LCH3~6, the TX UE may select or determine one LCH, from LCH4 and LCH3, to generate a data packet comprising sidelink data on the one LCH, wherein the destination or UE of the data packet is associated with the one LCH. In one embodiment, the one LCH selection or determination from LCH4 and LCH3 may be TX UE implementation. Additionally or alternatively, the TX UE may select or determine the one LCH, from LCH4 and LCH3, with shorter remaining packet delay budget. Additionally or alternatively, the TX UE may select or determine the one LCH, from LCH4 and LCH3, based on cast-type associated with LCH4 and LCH3, such as preferentially select or determine groupcast or preferentially select or determine unicast. Additionally or alternatively, the TX UE may select or determine the one LCH based on whether SL DRX is supported. Such as for another case, if LCH3 and LCH6 are both with highest priority, the TX UE preferentially select or determine LCH3 with SL DRX.

In FIG. 12, considering another case that the TX UE may perform logical channel prioritization and determine or derive a destination or UE between the timing of sidelink resource R1 and R2. The most recent sidelink resource will be R2. The TX UE may derive or know sidelink active time of RX UE1~RX UE5 or LCH1~LCH5, based on associated sidelink DRX configurations, parameters, or patterns. For instance, the TX UE may derive, know, expect, or assume sidelink active time of RX UE1~RX UE5 or LCH1~LCH5, based on associated sidelink onduration timer being running. The TX UE may not have sidelink DRX configurations, parameters, or patterns for RX UE6 or LCH6. Note that the LCH1~LCH6 are sidelink logical channels, of the TX UE, with available sidelink data.

Since sidelink active time of RX UE1 or LCH1 does not comprise timing of the sidelink resources R2, the TX UE will not consider LCH1 or RX UE1 for performing logical channel prioritization and/or destination/UE determination or selection.

Since sidelink active time of RX UE2 or LCH2 comprises timing of the sidelink resources R2, the TX UE will consider LCH2 or RX UE2 for performing logical channel prioritization and/or destination/UE determination or selection.

Since sidelink active time of RX UE3 or LCH3 comprises timing of the sidelink resources R2, the TX UE will consider LCH3 or RX UE3 for performing logical channel prioritization and/or destination/UE determination or selection.

Since sidelink active time of RX UE4 or LCH4 does not comprise timing of the sidelink resources R2, the TX UE will not consider LCH4 or RX UE4 for performing logical channel prioritization and destination/UE determination or selection.

Since sidelink active time of RX UE5 or LCH5 comprises timing of the sidelink resources R2, the TX UE will consider LCH5 or RX UE5 for performing logical channel prioritization and/or destination/UE determination or selection.

Since there is no SL DRX for RX UE6 or LCH6, the TX UE will consider LCH6 or RX UE6 for performing logical channel prioritization and/or destination/UE determination or selection.

Thus, the TX UE may perform logical channel prioritization among LCH2,3,5,6, and determine a destination or UE accordingly.

For one instance, if LCH3 is with highest priority among LCH2,3,5,6, the TX UE may generate a data packet comprising (at least) sidelink data on (or associated with) the LCH3, wherein the destination or UE of the data packet is UE3. The TX UE may perform two PSCCH or PSSCH transmissions respectively on the sidelink resources R2, R3. It is since the TX UE generates the data packet after the timing of sidelink resource R1. The PSCCH or PSSCH transmission on the sidelink resource R2 may be initial sidelink transmission of the data packet. The RV may be set to zero for the PSCCH or PSSCH transmission on the sidelink resource R2. The PSCCH or PSSCH transmissions on the sidelink resources R3 may be sidelink retransmissions of the data packet. The RV may be set to non-zero for the PSCCH or PSSCH transmissions on the sidelink resources R3. In one embodiment, the TX UE may expect or assume sidelink inactivity timer of the RX UE3 will (re)start in response to PSCCH or PSSCH transmission on the sidelink resource R2. The sidelink active time of RX UE3 may extend because RX UE3's sidelink inactivity timer is running.

For instance, if LCH2 and LCH3 are both with highest priority among LCH2,3,5, 6, the TX UE may select or determine one LCH, from LCH2 and LCH3, to generate a data packet comprising sidelink data on the one LCH, wherein the destination or UE of the data packet is associated with the one LCH. In one embodiment, the one LCH selection or determination from LCH2 and LCH3 may be TX UE implementation. Additionally or alternatively, the TX UE may select or determine the one LCH, from LCH2 and LCH3, with shorter remaining packet delay budget. Additionally or alternatively, the TX UE may select or determine the one LCH, from LCH4 and LCH3, based on cast-type associated with LCH2 and LCH3, such as preferentially select or determine groupcast or preferentially select or determine unicast. Additionally or alternatively, the TX UE may select or determine the one LCH based on whether SL DRX is supported. Such as for another case, if LCH2 and LCH6 are both with highest priority, the TX UE preferentially select or determine LCH2 with SL DRX.

Method d

The general concept of method d is that the first UE (generates the first data packet and) determines, derives, or selects the destination or UE based on all of the one set of sidelink resources and sidelink DRX configurations, parameters, or patterns of one or more destinations or UEs associated with the one or more sidelink logical channels. In one embodiment, the first UE may determine or derive the set of sidelink logical channels based on all of the one set of sidelink resources and sidelink DRX configurations, parameters, or patterns of one or more destinations or UEs associated with the one or more sidelink logical channels. Additionally or alternatively, the first UE may determine or derive the set of sidelink logical channels based on all of the one set of sidelink resources and sidelink DRX configurations, parameters, or patterns associated with the one or more sidelink logical channels.

In one embodiment, the first UE determines or derives the set of sidelink logical channels based on a condition that in the timing(s) of all of the one set of sidelink resources, whether or which destination(s) or UE(s), among the one or more destinations or UEs associated with the one or more sidelink logical channels, is/are in sidelink active time. More specifically, in the timing(s) of all of the one set of sidelink resources, if a destination or UE, among the one or more destinations or UEs associated with the one or more sidelink logical channels, is in sidelink active time, the first UE determines a logical channel associated with the destination or UE as being in the set of sidelink logical channels. In the timing(s) of any of the one set of sidelink resources, if a destination or UE, among the one or more destinations or UEs associated with the one or more sidelink logical channels, is not in sidelink active time, the first UE determines a logical channel associated with the destination or UE as not being in the set of sidelink logical channels.

In one embodiment, the first UE determines or derives the set of sidelink logical channels based on a condition that (the timing(s) of) all of the one set of sidelink resources is in which destination(s)/UE(s)'s sidelink active time(s), among the one or more destinations or UEs associated with the one or more sidelink logical channels. More specifically, if (the timing(s) of) all of the one set of sidelink resources is in sidelink active time of a destination or UE, among the one or more destinations or UEs associated with the one or more sidelink logical channels, a sidelink logical channel associated with the destination or UE is considered or determined in the set of sidelink logical channels. If (the timing(s) of) any of the one set of sidelink resources is not in sidelink active time of a destination or UE, among the one or more destinations or UEs associated with the one or more sidelink logical channels, a sidelink logical channel associated with the destination or UE is not considered or determined in the set of sidelink logical channels.

In one embodiment, the first UE determines or derives the set of sidelink logical channels based on a condition that (the timing(s) of) all of the one set of sidelink resources is in which sidelink active time(s) associated with the one or more sidelink logical channels. More specifically, if (the timing(s) of) all of the one set of sidelink resources are in sidelink active time associated with a sidelink logical channel, among the one or more sidelink logical channels, the sidelink logical channel is considered or determined in the set of sidelink logical channels. If (the timing(s) of) any of the one set of sidelink resources is not in sidelink active time associated with a sidelink logical channel, among the one or more sidelink logical channels, the sidelink logical channel is not considered or determined in the set of sidelink logical channels.

In one embodiment, the first UE determines or derives the set of sidelink logical channels based on a condition that which destination(s)/UE(s)'s sidelink active time(s), among the one or more destinations or UEs associated with the one or more sidelink logical channels, comprises or includes (the timing(s) of) all of the one set of sidelink resources. More specifically, if sidelink active time associated with a destination or UE, among the one or more destination(s) or UE(s), comprises or includes (the timing(s) of) all of the one set of sidelink resources, a sidelink logical channel associated with the destination or UE is considered or determined in the set of sidelink logical channels. If sidelink active time associated with a destination or UE, among the one or more destination(s) or UE(s), does not comprise or include (the timing(s) of) all of the one set of sidelink resources, a sidelink logical channel associated with the destination or UE is not considered or determined in the set of sidelink logical channels.

In one embodiment, the first UE determines or derives the set of sidelink logical channels based on a condition that which sidelink active time(s) associated with the one or more sidelink logical channels comprises or includes (the timing(s) of) all of the one set of sidelink resources. More specifically, if sidelink active time associated with a sidelink logical channel, among the one or more sidelink logical channels, comprises or includes (the timing(s) of) all of the one set of sidelink resources, the sidelink logical channel is considered or determined in the set of sidelink logical channels. If sidelink active time associated with a sidelink logical channel, among the one or more sidelink logical channels, does not comprise or include (the timing(s) of) all of the one set of sidelink resources, the sidelink logical channel is not considered/determined in the set of sidelink logical channels.

For Method a or d:

In one embodiment, the any of the one set of sidelink resources may mean any of all the one set of sidelink resources. Furthermore, the all of the one set of sidelink resources may mean all the one set of sidelink resources.

For instance, if the one set of sidelink resources comprise three sidelink resources, the any of the one set of sidelink resources may mean any of the first, the second, or the third sidelink resource of the one set. The all of the one set of sidelink resources may mean the first, the second, and the third sidelink resource of the one set.

For instance, if the one set of sidelink resources comprise two sidelink resources, the any of the one set of sidelink resources may mean any of the first, or the second sidelink resource of the one set. The all of the one set of sidelink resources may mean the first and the second sidelink resource of the one set.

For instance, if the one set of sidelink resources comprise one sidelink resource, the any of the one set of sidelink resources may mean the first sidelink resource of the one set. The all of the one set of sidelink resources may mean the first sidelink resource of the one set.

Additionally or alternatively, the any of the one set of sidelink resources may mean any of remaining sidelink resources of the one set of sidelink resources when the first UE (is going to) generate the first data packet or perform logical channel prioritization or determine destination or UE. In one embodiment, the all of the one set of sidelink resources may mean all of remaining sidelink resources of the one set of sidelink resources when the first UE (is going to) generate the first data packet or perform logical channel prioritization or determine destination or UE.

In the instance that the one set of sidelink resources comprise three sidelink resources, if the first UE (is going to) generate the first data packet before the timing of the first sidelink resource, the any of remaining sidelink resources may mean any of the first, the second, or the third sidelink resource of the one set. The all of remaining sidelink resources may mean the first, the second, and the third sidelink resource of the one set. If the first UE (is going to) generate the first data packet between the timing of the first sidelink resource and the timing of the second sidelink resource, the any of remaining sidelink resources may mean any of the second or the third sidelink resource of the one set. The all of remaining sidelink resources may mean the second and the third sidelink resource of the one set. If the first UE (is going to) generate the first data packet between the timing of the second sidelink resource and the timing of the third sidelink resource, the any of remaining sidelink resources may mean the third sidelink resource of the one set. The all of remaining sidelink resources may mean the third sidelink resource of the one set.

In the instance that the one set of sidelink resources comprise two sidelink resources, if the first UE (is going to) generate the first data packet before the timing of the first sidelink resource, the any of remaining sidelink resources may mean any of the first or the second sidelink resource of the one set. The all of remaining sidelink resources may mean any of the first and the second sidelink resource of the one set. If the first UE (is going to) generate the first data packet between the timing of the first sidelink resource and the timing of the second sidelink resource, the any of remaining sidelink resources may mean the second sidelink resource of the one set. The all of remaining sidelink resources may mean the second sidelink resource of the one set.

In the instance that the one set of sidelink resources comprise one sidelink resource, if the first UE (is going to) generate the first data packet before the timing of the first sidelink resource, the any of remaining sidelink resources may mean the first sidelink resource of the one set. The all of remaining sidelink resources may mean the first sidelink resource of the one set.

In one embodiment, the first sidelink resource may mean the earliest sidelink resource, in time domain, among the one set of sidelink resources. The second sidelink resource may mean the second earliest (or the last if there are two sidelink resources in the one set) sidelink resource, in time domain, among the one set of sidelink resources. The third sidelink resource may mean the third earliest or the last sidelink resource (if there are three sidelink resources in the one set), in time domain, among the one set of sidelink resources.

For all Above Concepts, Methods, Alternatives and Embodiments

Note that any of above methods, alternatives and embodiments may be combined or applied simultaneously or sequentially. In one embodiment, a hybrid method, alternative, or embodiment from method a~d may be possible and not precluded. In the instance that the first UE has one or more sidelink logical channels with available sidelink data, if the first UE cannot determine, select, or derive a destination or UE based on method c, the first UE may adopt or apply other method, e.g. method a, to determine, select, or derive a destination or UE. In the instance that the first UE has one or more sidelink logical channels with available sidelink data, if the first UE cannot determine, select, or derive a destination or UE based on method d, the first UE may adopt or apply other method, e.g. method a or b or c, to determine, select, or derive a destination or UE. Note that other combinations of any methods a~d are possible and not limited in the instances.

In one embodiment, the first UE may perform one or more sidelink transmissions on the one set of reserved sidelink resources, wherein the one or more sidelink transmissions includes, delivers, or comprises the same first data packet. The first UE may not use more than one set of reserved sidelink resources for transmitting the same first data packet. The first UE may preclude, prevent, or prohibit from using more than one set of reserved sidelink resources for transmitting the same first data packet. For the periodic sidelink resource reservation, the first UE may only transmit the same one data packet on one set of reserved sidelink resources in one period.

In one embodiment, the one or more sidelink logical channels are in the first UE. The available sidelink data on the one or more sidelink logical channels are in the first UE.

In one embodiment, the first UE may generate the first data packet before a first timing of the first sidelink resource among the one set of sidelink resources. If the first UE have one or more sidelink logical channels with available sidelink data before the first timing of the first sidelink resource, the first UE may generate the first data packet before the first timing of the first sidelink resource. The first sidelink resource may mean the earliest sidelink resource, in time domain, among the one set of sidelink resources. In one embodiment, for method c, the most recent sidelink resource may be the first sidelink resource.

Additionally or alternatively, if the first UE has no sidelink logical channels with available sidelink data before the first timing of the first sidelink resource, and if the first UE have one or more sidelink logical channels with available sidelink data before a second timing of the second sidelink resource among the one set of sidelink resource, the first UE may generate the first data packet before the second timing of the second sidelink resource. The second sidelink resource may mean the second earliest (or the last if there are two sidelink resources in the one set) sidelink resource, in time domain, among the one set of sidelink resources. In one embodiment, for method c, the most recent sidelink resource is the first sidelink resource.

Additionally or alternatively, if the first UE has no sidelink logical channels with available sidelink data before the second timing of the second sidelink resource, and if the first UE have one or more sidelink logical channels with available sidelink data before a third timing of the third sidelink resource among the one set of sidelink resource, the first UE may generate the first data packet before the third timing of the third sidelink resource. The third sidelink resource may mean the third earliest or the last sidelink resource (if there are three sidelink resources in the one set) sidelink resource, in time domain, among the one set of sidelink resources. In one embodiment, for method c, the most recent sidelink resource is the first sidelink resource.

For method b, in one embodiment, the first UE may generate the first data packet before a first timing of the first sidelink resource among the one set of sidelink resources. If the first UE have one or more sidelink logical channels with available sidelink data before the first timing of the first sidelink resource, the first UE may generate the first data packet before the first timing of the first sidelink resource.

Additionally or alternatively, for method b, if the first UE has no sidelink logical channels with available sidelink data before the first timing of the first sidelink resource, the first UE may not generate the first data packet. The first UE may not use the set of sidelink resources for performing sidelink transmissions.

Additionally or alternatively, for method d, if the first UE has no sidelink logical channels with available sidelink data before the first timing of the first sidelink resource, the first UE may not generate the first data packet. The first UE may not use the set of sidelink resources for performing sidelink transmissions.

In addition, the sidelink DRX configuration may comprise any of a parameter of sidelink on-duration timer, a parameter of sidelink inactivity timer, a timing offset for sidelink on-duration, and/or sidelink DRX cycle. The sidelink DRX parameter may comprise or mean any of a parameter of sidelink on-duration timer, a parameter of sidelink inactivity timer, a timing offset for sidelink on-duration, and/or sidelink DRX cycle. The sidelink active time includes the timing while corresponding sidelink on-duration timer or sidelink inactivity timer (e.g. a sidelink on-duration timer or sidelink inactivity timer corresponding to a destination or UE or a sidelink logical channel) is running. In one embodiment, the sidelink DRX pattern may comprise or mean a time pattern of the sidelink active time and/or sidelink non-active time within one sidelink DRX cycle.

In one embodiment, the first UE may consider, derive, or determine that a timing is in sidelink active time, if the first UE assumes, expects, derives, or determines corresponding sidelink on-duration timer (e.g. a sidelink on-duration timer corresponding to a destination or UE or a sidelink logical channel) is running in the timing. Additionally or alternatively, the first UE may consider, derive, or determine that a timing is not in sidelink active time, if the first UE assumes, expects, derives, or determines corresponding sidelink on-duration timer is not running in the timing.

Additionally or alternatively, the first UE may consider, derive, or determine that a timing is in sidelink active time, if the first UE assumes, expects, derives, or determines corresponding sidelink inactivity timer or sidelink on-duration timer (e.g. a sidelink inactivity timer or sidelink on-duration timer corresponding to a destination or UE or a sidelink logical channel) is running in the timing. Additionally or alternatively, the first UE may consider, derive, or determine that a timing is not in sidelink active time, if the first UE assumes, expects, derives, or determines corresponding neither sidelink inactivity timer nor sidelink on-duration timer (e.g. a sidelink inactivity timer or sidelink on-duration timer corresponding to a destination or UE or a sidelink logical channel) is running in the timing.

In one embodiment, the periodic sidelink resource reservation may be provided, indicated, or derived based on a sidelink configured grant type 1. Additionally or alternatively, the periodic sidelink resource reservation may be provided, indicated, or derived based on a sidelink configured grant type 2. Additionally or alternatively, the periodic sidelink resource reservation may be provided, indicated, or derived based on a selected sidelink grant corresponding to transmission(s) of multiple MAC PDUs.

In one embodiment, for the periodic sidelink resource reservation, one set of sidelink resources (in one period) may comprise or include at most three sidelink resources. Preferably, the time gap between any two sidelink resources of the one set of sidelink resources may be smaller than or equal to 31 or 32 sidelink slots.

In one embodiment, the periodic sidelink resource reservation may (restrict or limit to) be used for transmissions, from the first UE, to destination(s) or UE(s) with associated DRX configuration, parameters, or patterns. The one or more sidelink logical channels may be associated with destination(s) or UE(s) with associated DRX configuration, parameters, or patterns.

Additionally or alternatively, the periodic sidelink resource reservation may (restrict or limit to) be used for sidelink data on sidelink logical channel(s) with associated DRX configuration, parameters, or patterns. The one or more sidelink logical channels may have associated sidelink DRX configuration, parameters, or patterns.

Additionally or alternatively, the periodic sidelink resource reservation may not restrict or limit to be used for transmissions, from the first UE, to destination(s) or UE(s) with associated DRX configuration, parameters, or patterns. The periodic sidelink resource reservation may not restrict or limit to be used for sidelink data on sidelink logical channel(s) with associated DRX configuration, parameters, or patterns. In one embodiment, the periodic sidelink resource reservation may (allow to) be used for transmissions, from the first UE, to destination(s) or UE(s) without associated DRX configuration, parameters, or patterns. The periodic sidelink resource reservation may (allow to) be used for sidelink data on sidelink logical channel(s) without associated DRX configuration, parameters, or patterns.

In one embodiment, if the first UE does not have or acquire sidelink DRX configurations, parameters, or patterns of a destination or UE, the first UE determines a logical channel associated with the destination or UE as being in the set of sidelink logical channels. If the first UE knows, expects, or assumes the destination or UE does not perform sidelink DRX procedure, the first UE determines a logical channel associated with the destination or UE as being in the set of sidelink logical channels.

In one embodiment, if the first UE does not have sidelink DRX configurations, parameters, or patterns for a sidelink logical channel with available sidelink data, the first UE determines the sidelink logical channel as being in the set of sidelink logical channels. If the first UE does not have sidelink DRX configurations, parameters, or patterns for a sidelink logical channel with available sidelink data, the sidelink logical channel is in the set of sidelink logical channels.

In one embodiment, if there is no sidelink MAC CE for transmission, the first UE may set, determine, or select the destination or UE of the first data packet based on the selected or determined sidelink logical channel. The first UE may set, determine, or select the destination or UE of the first data packet as the first destination or UE associated with the selected or determined sidelink logical channel. The first UE may comprise, include, or multiplex available sidelink data on the selected or determined sidelink logical channel in the first data packet.

In one embodiment, if there is one sidelink MAC for transmission, the first UE may set, determine, or select the destination or UE of the first data packet based on the selected or determined sidelink logical channel and the one sidelink MAC CE. The first UE may set, determine, or select the destination or UE of the first data packet based on priority of the selected or determined sidelink logical channel and priority of the one sidelink MAC CE, e.g. based on the one with highest priority.

More specifically, if priority of the selected or determined sidelink logical channel is lower than priority of the one sidelink MAC CE, the first UE may set, determine, or select the destination or UE of the first data packet as a second destination or UE associated with the one sidelink MAC CE. If the second destination or UE associated with the one sidelink MAC CE is different from the first destination or UE associated with the selected or determined sidelink logical channel, the first UE may comprise, include, or multiplex the one sidelink MAC CE in the first data packet, and may not comprise, include, or multiplex available sidelink data on the selected or determined sidelink logical channel in the first data packet. If the second destination or UE associated with the one sidelink MAC CE is the same as the first destination or UE associated with the selected or determined sidelink logical channel, the first UE may comprise, include, or multiplex the one sidelink MAC CE in the first data packet, and may comprise, include, or multiplex available sidelink data on the selected or determined sidelink logical channel in the first data packet.

More specifically, if priority of the selected or determined sidelink logical channel is higher than priority of the one sidelink MAC CE, the first UE may set, determine, or select the destination or UE of the first data packet as the first destination or UE associated with the selected or determined sidelink logical channel. If a second destination or UE associated with the one sidelink MAC CE is different from the first destination or UE associated with the selected or determined sidelink logical channel, the first UE may not comprise, include, or multiplex the one sidelink MAC CE in the first data packet, and may comprise, include, or multiplex available sidelink data on the selected or determined sidelink logical channel in the first data packet. If the second destination or UE associated with the one sidelink MAC CE is the same as the first destination or UE associated with the selected or determined sidelink logical channel, the first UE may comprise, include, or multiplex the one sidelink MAC CE in the first data packet, and may comprise, include, or multiplex available sidelink data on the selected or determined sidelink logical channel in the first data packet.

More specifically, if priority of the selected or determined sidelink logical channel is the same as priority of the one sidelink MAC CE, it may be UE implementation for the first UE to set, determine, or select the destination or UE of the first data packet as any one of the first destination or UE associated with the selected or determined sidelink logical channel and the second destination or UE associated with the one sidelink MAC CE. If the second destination or UE associated with the one sidelink MAC CE is different from the first destination or UE associated with the selected or determined sidelink logical channel, the first UE may comprise, include, or multiplex either the one sidelink MAC CE or available sidelink data on the selected or determined sidelink logical channel in the first data packet, based on the set, determined, or selected destination or UE of the first data packet. If the second destination or UE associated with the one sidelink MAC CE is the same as the first destination or UE associated with the selected or determined sidelink logical channel, the first UE may comprise, include, or multiplex the one sidelink MAC CE in the first data packet, and may comprise, include, or multiplex available sidelink data on the selected or determined sidelink logical channel in the first data packet.

In one embodiment, the first UE may have one or more sidelink MAC CEs (for transmission). Each of the one or more sidelink MAC CEs may be associated with a destination or UE. (For generating the first data packet) the UE may determine or select the one sidelink MAC CE from or among the one or more sidelink MAC CEs.

In one embodiment, the one sidelink MAC CE may be determined or selected based on similar concept of one of the methods a~d:

(Similar as method a) In one embodiment, the first UE may determine or select the one sidelink MAC CE based on any of the one set of sidelink resources and sidelink DRX configurations, parameters, or patterns of one or more destinations or UEs associated with the one or more sidelink MAC CE.

In one embodiment, in the timing(s) of any of the one set of sidelink resources, if a destination or UE, among the one or more destinations or UEs associated with the one or more sidelink MAC CE, is in sidelink active time, the first UE is able to determine or select a sidelink MAC CE associated with the destination or UE as the one sidelink MAC CE. In the timing(s) of all of the one set of sidelink resources, if a destination or UE, among the one or more destinations or UEs associated with the one or more sidelink MAC CE, is not in sidelink active time, the first UE is not able to determine or select a sidelink MAC CE associated with the destination or UE as the one sidelink MAC CE.

In one embodiment, if (the timing(s) of) any of the one set of sidelink resources is in sidelink active time of a destination or UE, among the one or more destinations or UEs associated with the one or more sidelink MAC CE, the first UE is able to determine or select a sidelink MAC CE associated with the destination or UE as the one sidelink MAC CE. If (the timing(s) of) all of the one set of sidelink resources are not in sidelink active time of a destination or UE, among the one or more destinations or UEs associated with the one or more sidelink MAC CE, the first UE is not able to determine or select a sidelink MAC CE associated with the destination or UE as the one sidelink MAC CE.

In one embodiment, if sidelink active time associated with a destination or UE, among the one or more destination(s) or UE(s) associated with the one or more sidelink MAC CE, comprises or includes (the timing(s) of) any of the one set of sidelink resources, the first UE is able to determine or select a sidelink MAC CE associated with the destination or UE as the one sidelink MAC CE. If sidelink active time associated with a destination or UE, among the one or more destination (s) or UE(s) associated with the one or more sidelink MAC CE, does not comprise or include (the timing(s) of) any of the one set of sidelink resources, the first UE is not able to determine or select a sidelink MAC CCE associated with the destination or UE as the one sidelink MAC CE.

(Similar as method b) In one embodiment, the first UE may determine or select the one sidelink MAC CE based on the first sidelink resource of the one set of sidelink resources and sidelink DRX configurations, parameters, or patterns of one or more destinations or UEs associated with the one or more sidelink MAC CE.

In one embodiment, in the timing of the first sidelink resource of the one set of sidelink resources, if a destination or UE, among the one or more destinations or UEs associated with the one or more sidelink MAC CE, is in sidelink active time, the first UE is able to determine or select a sidelink MAC CE associated with the destination or UE as the one sidelink MAC CE. In the timing of the first sidelink resource of the one set of sidelink resources, if a destination or UE, among the one or more destinations or UEs associated with the one or more sidelink MAC CE, is not in sidelink active time, the first UE is not able to determine or select a sidelink MAC CE associated with the destination or UE as the one sidelink MAC CE.

In one embodiment, if (the timing of) the first sidelink resource of the one set of sidelink resources is in sidelink active time of a destination or UE, among the one or more destinations or UEs associated with the one or more sidelink MAC CE, the first UE is able to determine or select a sidelink MAC CE associated with the destination or UE as the one sidelink MAC CE. If (the timing of) the first sidelink resource of the one set of sidelink resources is not in sidelink active time of a destination or UE, among the one or more destinations or UEs associated with the one or more sidelink MAC CE, the first UE is not able to determine or select a sidelink MAC CE associated with the destination or UE as the one sidelink MAC CE.

In one embodiment, if sidelink active time associated with a destination or UE, among the one or more destination(s) or UE(s) associated with the one or more sidelink MAC CE, comprises or includes (the timing of) the first sidelink resource of the one set of sidelink resources, the first UE is able to determine or select a sidelink MAC CE associated with the destination or UE as the one sidelink MAC CE. If sidelink active time associated with a destination or UE, among the one or more destination(s) or UE(s) associated with the one or more sidelink MAC CE, does not comprise or include (the timing of) the first sidelink resource of the one set of sidelink resources, the first UE is not able to determine or select a sidelink MAC CCE associated with the destination/UE as the one sidelink MAC CE.

(Similar as method c) In one embodiment, the first UE may determine or select the one sidelink MAC CE based on the most recent sidelink resource of the one set of sidelink resources and sidelink DRX configurations, parameters, or patterns of one or more destinations or UEs associated with the one or more sidelink MAC CE.

In one embodiment, in the timing of the most recent sidelink resource of the one set of sidelink resources, if a destination or UE, among the one or more destinations or UEs associated with the one or more sidelink MAC CE, is in sidelink active time, the first UE is able to determine or select a sidelink MAC CE associated with the destination or UE as the one sidelink MAC CE. In the timing of the most recent sidelink resource of the one set of sidelink resources, if a destination or UE, among the one or more destinations or UEs associated with the one or more sidelink MAC CE, is not in sidelink active time, the first UE is not able to determine or select a sidelink MAC CE associated with the destination or UE as the one sidelink MAC CE.

In one embodiment, if (the timing of) the most recent sidelink resource of the one set of sidelink resources is in sidelink active time of a destination or UE, among the one or more destinations or UEs associated with the one or more sidelink MAC CE, the first UE is able to determine or select a sidelink MAC CE associated with the destination or UE as the one sidelink MAC CE. If (the timing of) the most recent sidelink resource of the one set of sidelink resources is not in sidelink active time of a destination or UE, among the one or more destinations or UEs associated with the one or more sidelink MAC CE, the first UE is not able to determine or select a sidelink MAC CE associated with the destination or UE as the one sidelink MAC CE.

In one embodiment, if sidelink active time associated with a destination or UE, among the one or more destination(s) or UE(s) associated with the one or more sidelink MAC CE, comprises or includes (the timing of) the f most recent sidelink resource of the one set of sidelink resources, the first UE is able to determine or select a sidelink MAC CE associated with the destination or UE as the one sidelink MAC CE. If sidelink active time associated with a destination or UE, among the one or more destination(s) or UE(s) associated with the one or more sidelink MAC CE, does not comprise or include (the timing of) the most recent sidelink resource of the one set of sidelink resources, the first UE is not able to determine or select a sidelink MAC CCE associated with the destination or UE as the one sidelink MAC CE.

(Similar as method d) In one embodiment, the first UE may determine or select the one sidelink MAC CE based on all of the one set of sidelink resources and sidelink DRX configurations, parameters, or patterns of one or more destinations or UEs associated with the one or more sidelink MAC CE.

In one embodiment, in the timing(s) of all of the one set of sidelink resources, if a destination or UE, among the one or more destinations or UEs associated with the one or more sidelink MAC CE, is in sidelink active time, the first UE is able to determine or select a sidelink MAC CE associated with the destination or UE as the one sidelink MAC CE. In the timing(s) of any of the one set of sidelink resources, if a destination or UE, among the one or more destinations or UEs associated with the one or more sidelink MAC CE, is not in sidelink active time, the first UE is not able to determine or select a sidelink MAC CE associated with the destination or UE as the one sidelink MAC CE.

In one embodiment, if (the timing(s) of) all of the one set of sidelink resources are in sidelink active time of a destination or UE, among the one or more destinations or UEs associated with the one or more sidelink MAC CE, the first UE is able to determine or select a sidelink MAC CE associated with the destination or UE as the one sidelink MAC CE. If (the timing(s) of) any of the one set of sidelink resources is not in sidelink active time of a destination or UE, among the one or more destinations or UEs associated with the one or more sidelink MAC CE, the first UE is not able to determine or select a sidelink MAC CE associated with the destination or UE as the one sidelink MAC CE.

In one embodiment, if sidelink active time associated with a destination/UE, among the one or more destination(s) or UE(s) associated with the one or more sidelink MAC CE, comprises or includes (the timing(s) of) all of the one set of sidelink resources, the first UE is able to determine or select a sidelink MAC CE associated with the destination or UE as the one sidelink MAC CE. If sidelink active time associated with a destination or UE, among the one or more destination(s) or UE(s) associated with the one or more sidelink MAC CE, does not comprise or include (the timing(s) of) all of the one set of sidelink resources, the first UE is not able to determine or select a sidelink MAC CCE associated with the destination or UE as the one sidelink MAC CE.

In one embodiment, the determination or selection of the sidelink MAC CE may adopt or apply (similar) concept of the same method as the determination or derivation of the set of sidelink logical channels. Furthermore, the determination or selection of the sidelink MAC CE may adopt or apply (similar) concept of different method from the determination or derivation of the set of sidelink logical channels.

In one embodiment, the periodic sidelink resource reservation may represent, mean, or replace as semi-persistently sidelink resource reservation.

In one embodiment, when the first UE is configured or operates in network scheduling mode (e.g. sidelink resource allocation mode 1), the first UE may have the sidelink configured grant type 1, or the sidelink configured grant type 2. When the first UE is configured or operates in UE (autonomous) selection mode (e.g. sidelink resource allocation mode 2), the first UE may have the selected sidelink grant corresponding to transmission(s) of multiple MAC PDUs.

In one embodiment, the one set of sidelink resources may be not in the first period of the periodic sidelink resource reservation. Additionally or alternatively, the one set of sidelink resources may be in the first period of the periodic sidelink resource reservation. The one set of sidelink resources may be in the first period of the periodic sidelink resource reservation, when or after sidelink configured grant type 2 is activated, e.g. the first UE receives an activating DCI for sidelink configured grant type 2.

Additionally or alternatively, the concept of method a~d may apply or adopt for dynamic sidelink grant case in network scheduling mode (e.g. sidelink resource allocation mode 1). It means that in network scheduling mode (e.g. sidelink resource allocation mode 1), the concept of method a~d may not limit to periodic sidelink resource reservation. The first device may receive a (dynamic) sidelink grant from network node, e.g. DCI format 3_0, the (dynamic) sidelink grant may indicate or reserve a number of sidelink resources. Note that the number of sidelink resources are not periodically reserved for the first UE. In one embodiment, the one set of sidelink resources may mean the number of sidelink resources indicated or reserved by the (dynamic) sidelink grant. The first UE may (generates the first data packet and) determines, derives, or selects the destination or UE according the one set of sidelink resources and any of methods a~d. The first UE may determine or derive the set of sidelink logical channels according the one set of sidelink resources and any of methods a~d.

In one embodiment, the concept of method a~d may not apply or adopt for selected sidelink grant corresponding to transmission(s) of single MAC PDU case in UE (autonomous) selection mode (e.g. sidelink resource allocation mode 2).

In one embodiment, the first data packet may comprise or mean one transport block for sidelink. The first data packet may comprise or mean one MAC PDU for sidelink.

Additionally or alternative, the first data packet may comprise or mean at most two transport blocks for sidelink (e.g. if spatial multiplexing is supported). In one embodiment, the first data packet may comprise or mean at most two MAC PDUs for sidelink (e.g. if spatial multiplexing is supported). The at most two transport blocks or the at most two MAC PDU are associated with the same destination or UE. The at most two transport blocks or the at most two MAC PDU are transmitted in the same PSSCH transmission.

In one embodiment, the one or more sidelink transmissions may comprise or mean one or more sidelink data transmissions. The sidelink data transmission may be or mean PSSCH transmission.

In one embodiment, the first UE may transmit one or more sidelink control information (SCI), associated with the one or more sidelink data transmissions, on the one set of reserved sidelink resources. The one or more sidelink control information may indicate non-zero value of resource reservation period.

In one embodiment, the sidelink control information may comprise 1st stage SCI. The 1st stage SCI may be transmitted via PSCCH. The sidelink control information may comprise 2nd stage SCI. The 2nd stage SCI may be transmitted via multiplexed with PSSCH. The 1st stage SCI may mean or comprise SCI format 1-A. The 2st stage SCI may mean or comprise SCI format 2-A or 2-B.

In one embodiment, the first UE may (trigger to) perform the resource sensing (and selection), when or if the first UE requires sidelink resource for delivering or transmitting the sidelink data. The first sidelink (control and/or data) transmission is a new or initial sidelink transmission of the sidelink data. The first sidelink (control and/or data) transmission is a sidelink retransmission of the sidelink data.

In one embodiment, time unit of a sidelink resource may be one slot or within one set. The slot may mean sidelink slot. The slot may mean or comprise sidelink slot associated with the same sidelink resource pool. The slot may mean or comprise sidelink slot associated with the same SL BWP or the same cell or carrier.

In one embodiment, for one periodic sidelink resource reservation, each set of reserved sidelink resources may be within the same sidelink resource pool. Furthermore, for one periodic sidelink resource reservation, each set of reserved sidelink resources may be within the same sidelink resource pool in the same cell or carrier.

In one embodiment, time resource assignment field in sidelink control information can indicate reserved sidelink resource(s) in the same one set of sidelink resource. Resource reservation period field in sidelink control information can indicate reserved sidelink resource(s) across different sets of sidelink resource. Furthermore, resource reservation period field and Time resource assignment field in sidelink control information can indicate reserved sidelink resource(s) across different sets of sidelink resource.

In one embodiment, the destination or UE of the first data packet may be associated with (a destination ID of) a second UE.

In one embodiment, the first UE may have, maintain, or establish a sidelink link or connection with the second UE on PC5 interface. The sidelink DRX could be performed or operated for sidelink communication between the first UE and the second UE or for sidelink communication from the first UE to the second UE. The sidelink DRX configuration, parameter, or pattern may be configured for the sidelink link or connection between the first UE and the second UE or for sidelink communication from the first UE to the second UE.

In one embodiment, the destination or UE of the first data packet may be associated with (a destination ID of) a sidelink group.

In one embodiment, the first UE may have, maintain, or establish a sidelink link or connection with a sidelink group on PC5 interface, wherein the sidelink group comprises at least the first UE and other UE(s). The sidelink DRX could be performed or operated for sidelink communication of the sidelink group. The sidelink DRX configuration, parameter, or pattern may be configured for the sidelink group.

In one embodiment, the first UE may have, maintain, or stablish multiple sidelink links or connections on PC5 interface. For different sidelink links or connections, the first UE may perform sidelink transmission or reception to or from different paired UE(s).

In one embodiment, the first UE may have, maintain, or establish a first sidelink link or connection and a second sidelink link or connection. The paired UE or group of the first sidelink link or connection may be different from the paired UE or group of the second sidelink link or connection. The sidelink logical channel(s) associated with (the paired UE or group of) the first sidelink link or connection are separate or independent from the sidelink logical channel(s) associated with (the paired UE or group of) the second sidelink link or connection.

In one embodiment, the sidelink slot may mean slot for sidelink. A sidelink slot may be represented as a Transmission Time Interval (TTI). A TTI may be a subframe (for sidelink). A TTI may comprise multiple symbols, e.g. 12 or 14 symbols. The TTI may be a slot (fully/partially) comprising sidelink symbols. The TTI may mean a transmission time interval for a sidelink (data) transmission. A sidelink slot or a slot for sidelink may contain all OFDM symbols available for sidelink transmission. A sidelink slot or a slot for sidelink may contain a consecutive number symbols available for sidelink transmission. A sidelink slot or a slot for sidelink means that a slot is included in a sidelink resource pool.

In one embodiment, the symbol may mean a symbol indicated or configured for sidelink.

In one embodiment, a sub-channel may be a unit for sidelink resource allocation or scheduling (for PSSCH). A sub-channel may comprise multiple contagious PRBs in frequency domain. The number of PRBs for each sub-channel may be (pre-)configured for a sidelink resource pool. A sidelink resource pool (pre-)configuration may indicate or configure the number of PRBs for each sub-channel. The number of PRBs for each sub-channel may be any of 4, 5, 6, 8, 9, 10, 12, 15, 16, 18, 20, 25, 30, 48, 50, 72, 75, 96, 100. A sub-channel may be represented as a unit for sidelink resource allocation or scheduling. A sub-channel may mean a PRB. A sub-channel may mean a set of consecutive PRBs in frequency domain. A sub-channel may mean a set of consecutive resource elements in frequency domain.

In one embodiment, the UE may be, mean, comprise, or replace a device. The sidelink transmission or reception may be UE-to-UE transmission or reception, device-to-device transmission or reception, V2X transmission or reception, or P2X transmission or reception. The sidelink transmission or reception may be on PC5 interface.

In one embodiment, the PC5 interface may be wireless interface for communication between device and device. The PC5 interface may also be wireless interface for communication between devices. Furthermore, the PC5 interface may be wireless interface for communication between UEs. The PC5 interface may be wireless interface for V2X or P2X communication. The Uu interface may be wireless interface for communication between network node and device. The Uu interface may also be wireless interface for communication between network node and UE.

In one embodiment, the first UE may be a first device. The first device may be a vehicle UE or a V2X UE. The second UE may be a second device, a vehicle UE, or a V2X UE. In one embodiment, the first UE and the second device may be different devices.

Figure 13:
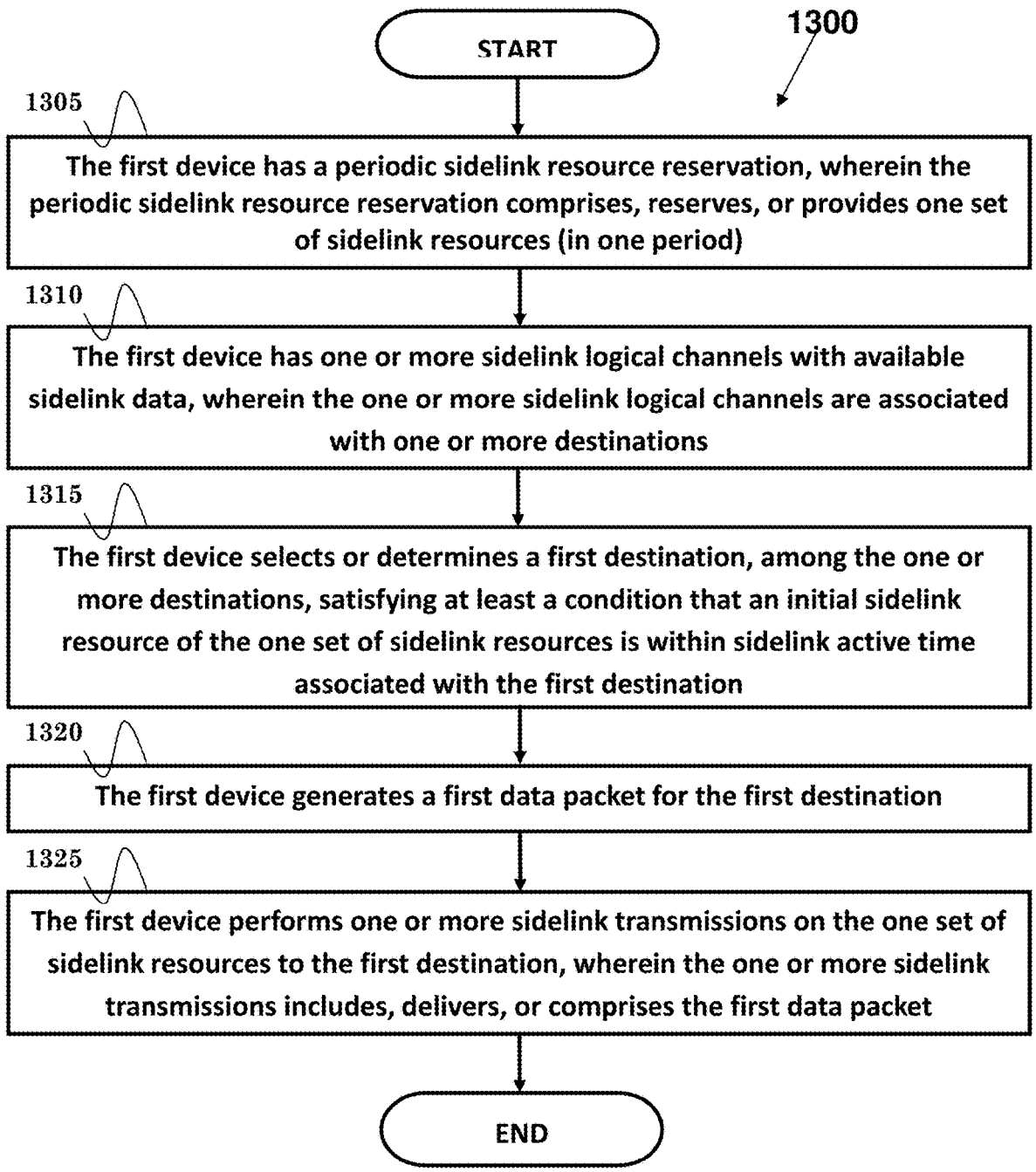
FIG. 13 is a flow chart according to one exemplary embodiment.

FIG. 13 is a flow chart 1300 according to one exemplary embodiment from the perspective of a first device to perform sidelink communication. In step 1305, the first device the first device has a periodic sidelink resource reservation, wherein the periodic sidelink resource reservation comprises, reserves, or provides one set of sidelink resources (in one period). In step 1310, the first device has one or more sidelink logical channels with available sidelink data, wherein the one or more sidelink logical channels are associated with one or more destinations. In step 1315, the first device selects or determines a first destination, among the one or more destinations, satisfying at least a condition that an initial sidelink resource of the one set of sidelink resources is within sidelink active time associated with the first destination. In step 1320, the first device generates a first data packet for the first destination. In step 1325, the first device performs one or more sidelink transmissions on the one set of sidelink resources to the first destination, wherein the one or more sidelink transmissions includes, delivers, or comprises the first data packet.

In one embodiment, the first device could select or determine the first destination based on at least the initial sidelink resource and sidelink DRX configurations, parameters, or patterns of the one or more destinations. One sidelink resource of the one set of sidelink resources, except the initial sidelink resource, may not be in sidelink active time associated with the first destination. When the initial sidelink resource is not in sidelink active time associated with a second destination among the one or more destinations, the first device could exclude or prevent from selecting or determining the second destination for utilizing the one set of sidelink resources. When the initial sidelink resource is not in sidelink active time associated with the second destination and if one sidelink resource of the one set of sidelink resources, except the initial sidelink resource, is in sidelink active time associated with the second destination, the first device could exclude or prevent from selecting or determining the second destination for utilizing the one set of sidelink resources.

In one embodiment, the sidelink DRX configuration or parameter may comprise any of a parameter of sidelink on-duration timer, a parameter of sidelink inactivity timer, a timing offset for sidelink on-duration, and/or sidelink DRX cycle. The sidelink active time could include the timing while corresponding sidelink on-duration timer or sidelink inactivity timer (e.g. a sidelink on-duration timer or sidelink inactivity timer corresponding to a destination or a sidelink logical channel) is running.

In one embodiment, the initial sidelink resource may mean the earliest sidelink resource, in time domain, among the one set of sidelink resources. The first device could generate the first data packet before a first timing of the initial sidelink resource among the one set of sidelink resources. When the first device has no sidelink logical channels with available sidelink data before the first timing of the initial sidelink resource, the first device may not generate the first data packet and not use the one set of sidelink resources for performing sidelink transmissions.

In one embodiment, the periodic sidelink resource reservation could be provided, indicated, or derived based on a sidelink configured grant type 1. The periodic sidelink resource reservation could be provided, indicated, or derived based on a sidelink configured grant type 2. The periodic sidelink resource reservation could be provided, indicated, or derived based on a selected sidelink grant corresponding to transmission(s) of multiple Medium Access Control (MAC) Protocol Data Units (PDUs).

In one embodiment, when the first device does not have sidelink Discontinuous Reception (DRX) configurations, parameters, or patterns for a third destination with available sidelink data, the first device may be able to select or determine the third destination for utilizing the one set of sidelink resources.

Referring back to FIGS. 3 and 4, in one exemplary embodiment of a first device to perform sidelink communication. The first device 300 includes a program code 312 stored in the memory 310. The CPU 308 could execute program code 312 to enable the first device (i) to have a periodic sidelink resource reservation, wherein the periodic sidelink resource reservation comprises, reserves, or provides one set of sidelink resources (in one period), (ii) to have one or more sidelink logical channels with available sidelink data, wherein the one or more sidelink logical channels are associated with one or more destinations, (iii) to select or determine a first destination, among the one or more destinations, satisfying at least a condition that an initial sidelink resource of the one set of sidelink resources is within sidelink active time associated with the first destination, (iv) to generate a first data packet for the first destination, and (v) to perform one or more sidelink transmissions on the one set of sidelink resources to the first destination, wherein the one or more sidelink transmissions includes, delivers, or comprises the first data packet. Furthermore, the CPU 308 can execute the program code 312 to perform all of the above-described actions and steps or others described herein.

Figure 14:
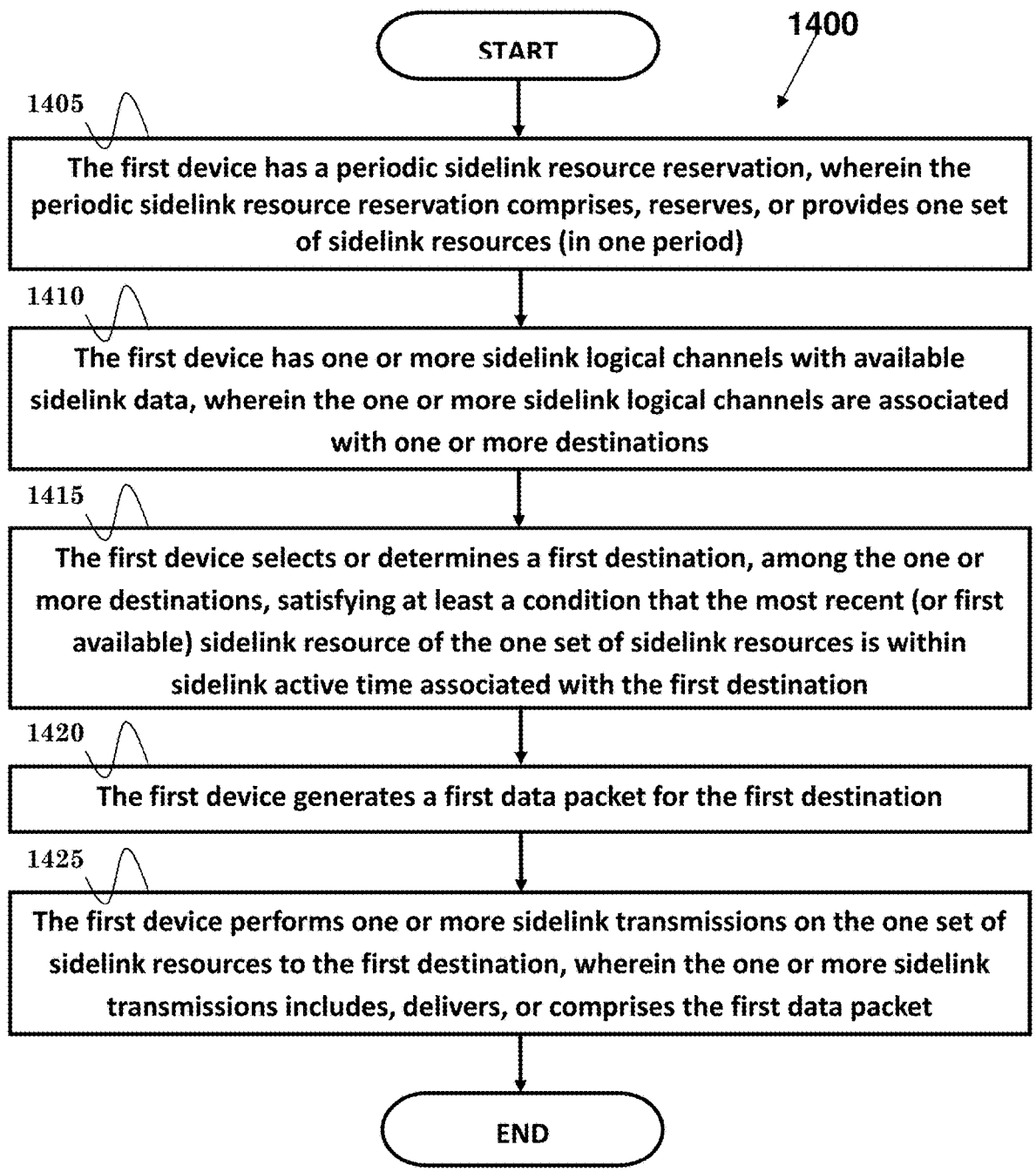
FIG. 14 is a flow chart according to one exemplary embodiment.

FIG. 14 is a flow chart 1400 according to one exemplary embodiment from the perspective of a first device to perform sidelink communication. In step 1405, the first device has a periodic sidelink resource reservation, wherein the periodic sidelink resource reservation comprises, reserves, or provides one set of sidelink resources (in one period). In step 1410, the first device has one or more sidelink logical channels with available sidelink data, wherein the one or more sidelink logical channels are associated with one or more destinations. In step 1415, the first device selects or determines a first destination, among the one or more destinations, satisfying at least a condition that the most recent (or first available) sidelink resource of the one set of sidelink resources is within sidelink active time associated with the first destination. In step 1420, the first device generates a first data packet for the first destination. In step 1425, the first device performs one or more sidelink transmissions on the one set of sidelink resources to the first destination, wherein the one or more sidelink transmissions includes, delivers, or comprises the first data packet.

In one embodiment, the first device could select or determine the first destination based on at least the most recent (or first available) sidelink resource and sidelink Discontinuous Reception (DRX) configurations, parameters, or patterns of the one or more destinations. One sidelink resource of the one set of sidelink resources, except the most recent (or first available) sidelink resource, may not be in sidelink active time associated with the first destination. When the most recent (or first available) sidelink resource is not in sidelink active time associated with a second destination among the one or more destinations, the first device could exclude or prevent from selecting or determining the second destination for utilizing the one set of sidelink resources. When the most recent (or first available) sidelink resource is not in sidelink active time associated with the second destination and if one sidelink resource of the one set of sidelink resources, except the most recent (or first available) sidelink resource, is in sidelink active time associated with the second destination, the first device could exclude or prevent from selecting or determining the second destination for utilizing the one set of sidelink resources.

In one embodiment, the sidelink DRX configuration or parameter may comprise any of a parameter of sidelink on-duration timer, a parameter of sidelink inactivity timer, a timing offset for sidelink on-duration, and/or sidelink DRX cycle. The sidelink active time may include the timing while corresponding sidelink on-duration timer or sidelink inactivity timer (e.g. a sidelink on-duration timer or sidelink inactivity timer corresponding to a destination or a sidelink logical channel) is running.

In one embodiment, the most recent (or first available) sidelink resource may mean the earliest sidelink resource, in time domain, among the one set of sidelink resources when or after the first device (is going to) generate the first data packet or performs logical channel prioritization or selects or determines a destination.

In one embodiment, when the first device have the one or more sidelink logical channels with available sidelink data before a first timing of a first or initial sidelink resource among the one set of sidelink resources, the first device could generate the first data packet before the first timing of the first or initial sidelink resource, wherein the most recent (or first available) sidelink resource is the first or initial sidelink resource. When the first device has no sidelink logical channels with available sidelink data before the first timing of the first or initial sidelink resource, and when the first device have the one or more sidelink logical channels with available sidelink data before a second timing of a second sidelink resource among the one set of sidelink resources, the first device could generate the first data packet before the second timing of the second sidelink resource, wherein the most recent (or first available) sidelink resource is the second sidelink resource.

In one embodiment, the periodic sidelink resource reservation could be provided, indicated, or derived based on a sidelink configured grant type 1. The periodic sidelink resource reservation could be provided, indicated, or derived based on a sidelink configured grant type 2. The periodic sidelink resource reservation could be provided, indicated, or derived based on a selected sidelink grant corresponding to transmission(s) of multiple Medium Access Control (MAC) Protocol Data Units (PDUs).

In one embodiment, when the first device does not have sidelink DRX configurations, parameters, or patterns for a third destination, the first UE may be able to select or determine the third destination for utilizing the one set of sidelink resources.

Referring back to FIGS. 3 and 4, in one exemplary embodiment of a first device to perform sidelink communication. The first device 300 includes a program code 312 stored in the memory 310. The CPU 308 could execute program code 312 to enable the first device (i) to have a periodic sidelink resource reservation, wherein the periodic sidelink resource reservation comprises, reserves, or provides one set of sidelink resources (in one period), (ii) to have one or more sidelink logical channels with available sidelink data, wherein the one or more sidelink logical channels are associated with one or more destinations, (iii) to select or determine a first destination, among the one or more destinations, satisfying at least a condition that the most recent (or first available) sidelink resource of the one set of sidelink resources is within sidelink active time associated with the first destination, (iv) to generates a first data packet for the first destination, and (v) to performs one or more sidelink transmissions on the one set of sidelink resources to the first destination, wherein the one or more sidelink transmissions includes, delivers, or comprises the first data packet. Furthermore, the CPU 308 can execute the program code 312 to perform all of the above-described actions and steps or others described herein.

Figure 15:
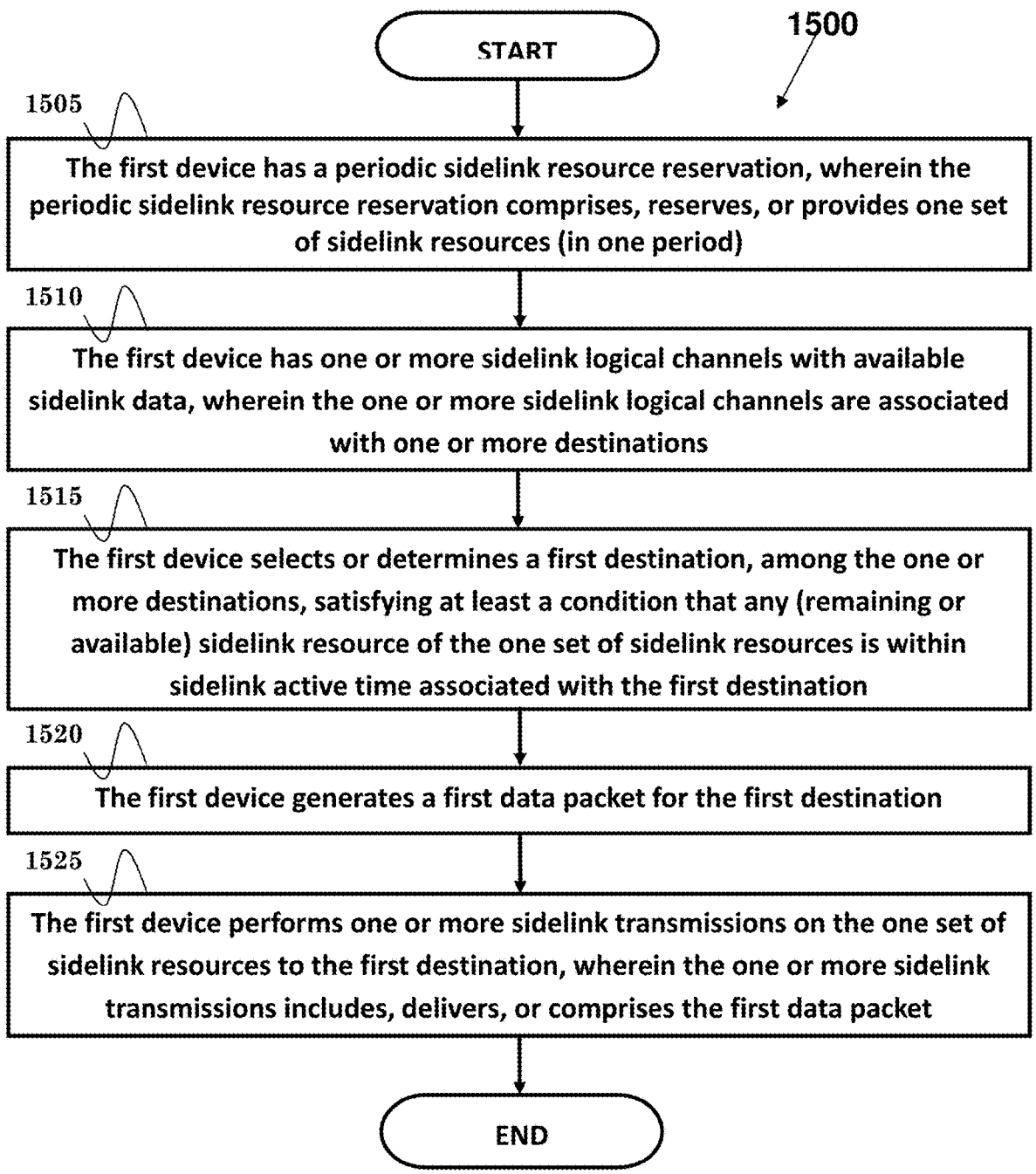
FIG. 15 is a flow chart according to one exemplary embodiment.

FIG. 15 is a flow chart 1500 according to one exemplary embodiment from the perspective of a first device to perform sidelink communication. In step 1505, the first device has a periodic sidelink resource reservation, wherein the periodic sidelink resource reservation comprises, reserves, or provides one set of sidelink resources (in one period). In step 1510, the first device has one or more sidelink logical channels with available sidelink data, wherein the one or more sidelink logical channels are associated with one or more destinations. In step 1515, the first device selects or determines a first destination, among the one or more destinations, satisfying at least a condition that any (remaining or available) sidelink resource of the one set of sidelink resources is within sidelink active time associated with the first destination. In step 1520, the first device generates a first data packet for the first destination. In step 1525, the first device performs one or more sidelink transmissions on the one set of sidelink resources to the first destination, wherein the one or more sidelink transmissions includes, delivers, or comprises the first data packet.

In one embodiment, the first device could select or determine the first destination based on any (remaining or available) sidelink resource of the one set of sidelink resources and sidelink Discontinuous Reception (DRX) configurations, parameters, or patterns of the one or more destinations. One sidelink resource of the one set of sidelink resources is not in sidelink active time associated with the first destination. When all of the one set of sidelink resources are not in sidelink active time associated with a second destination among the one or more destinations, the first device could exclude or prevent from selecting or determining the second destination for utilizing the one set of sidelink resources.

In one embodiment, the sidelink DRX configuration or parameter comprises any of a parameter of sidelink on-duration timer, a parameter of sidelink inactivity timer, a timing offset for sidelink on-duration, and/or sidelink DRX cycle. The sidelink active time could include the timing while corresponding sidelink on-duration timer or sidelink inactivity timer (e.g. a sidelink on-duration timer or sidelink inactivity timer corresponding to a destination or a sidelink logical channel) is running.

In one embodiment, the first device could generate the first data packet before a first timing of a first or initial sidelink resource among the one set of sidelink resources. When the first device has no sidelink logical channels with available sidelink data before the first timing of the first or initial sidelink resource, and when the first device have the one or more sidelink logical channels with available sidelink data before a second timing of a second sidelink resource among the one set of sidelink resource, the first device could generate the first data packet before the second timing of the second sidelink resource.

In one embodiment, the periodic sidelink resource reservation could be provided, indicated, or derived based on a sidelink configured grant type 1. The periodic sidelink resource reservation could be provided, indicated, or derived based on a sidelink configured grant type 2. The periodic sidelink resource reservation could be provided, indicated, or derived based on a selected sidelink grant corresponding to transmission(s) of multiple Medium Access Control (MAC) Protocol Data Units (PDUs).

In one embodiment, when the first device does not have sidelink Discontinuous Reception (DRX) configurations, parameters, or patterns for a third destination, the first device may be able to select or determine the third destination for utilizing the one set of sidelink resources.

Referring back to FIGS. 3 and 4, in one exemplary embodiment of a first device to perform sidelink communication. The first device 300 includes a program code 312 stored in the memory 310. The CPU 308 could execute program code 312 to enable the first device (i) to has a periodic sidelink resource reservation, wherein the periodic sidelink resource reservation comprises, reserves, or provides one set of sidelink resources (in one period), (ii) to has one or more sidelink logical channels with available sidelink data, wherein the one or more sidelink logical channels are associated with one or more destinations, (iii) to select or determine a first destination, among the one or more destinations, satisfying at least a condition that any (remaining or available) sidelink resource of the one set of sidelink resources is within sidelink active time associated with the first destination, (iv) to generate a first data packet for the first destination, and (v) to perform one or more sidelink transmissions on the one set of sidelink resources to the first destination, wherein the one or more sidelink transmissions includes, delivers, or comprises the first data packet. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a first device to perform sidelink communication, comprising:
   determining a periodic sidelink resource reservation comprising a set of sidelink resources in a period;
   determining one or more sidelink logical channels with available sidelink data, wherein the one or more sidelink logical channels are associated with destinations;
   selecting or determining, based upon at least one of sidelink Discontinuous Reception (DRX) configurations of the destinations, sidelink DRX parameters of the destinations, or sidelink DRX patterns of the destinations, a first destination from among the destinations at least when an initial sidelink resource of the set of sidelink resources is within sidelink active time associated with the first destination of the destinations;
   responsive to the selection or determination of the first destination, generating a first data packet for the first destination; and
   transmitting the first data packet on at least the initial sidelink resource of the set of sidelink resources to the first destination.

2. The method of claim 1, wherein at least one of:
   one sidelink resource of the set of sidelink resources, except the initial sidelink resource, is not in sidelink active time associated with the first destination;
   when the initial sidelink resource is not in sidelink active time associated with a second destination among the destinations, the first device excludes or prevents from selecting or determining the second destination for utilizing the set of sidelink resources; or
   when the initial sidelink resource is not in sidelink active time associated with the second destination and one sidelink resource of the set of sidelink resources, except the initial sidelink resource, is in sidelink active time associated with the second destination, the first device excludes or prevents from selecting or determining the second destination for utilizing the set of sidelink resources.

3. The method of claim 1, wherein at least one of:
   the sidelink DRX configurations, sidelink DRX parameters or sidelink DRX patterns comprise at least one of a parameter of sidelink on-duration timer, a parameter of sidelink inactivity timer, a timing offset for sidelink on-duration, or sidelink DRX cycle, or
   the sidelink active time includes timing corresponding to a sidelink on-duration timer or sidelink inactivity timer running.

4. The method of claim 1, wherein at least one of:
   the initial sidelink resource is the earliest sidelink resource, in time domain, among the set of sidelink resources,
   the first device generates the first data packet before a first timing of the initial sidelink resource among the set of sidelink resources, or
   when the first device has no sidelink logical channels with available sidelink data before the first timing of the initial sidelink resource, the first device does not generate the first data packet and not use the set of sidelink resources for performing sidelink transmissions.

5. The method of claim 1, wherein at least one of:
   the periodic sidelink resource reservation is provided, indicated, or derived based on a sidelink configured grant type 1,
   the periodic sidelink resource reservation is provided, indicated, or derived based on a sidelink configured grant type 2, or
   the periodic sidelink resource reservation is provided, indicated, or derived based on a selected sidelink grant corresponding to transmission(s) of multiple Medium Access Control (MAC) Protocol Data Units (PDUs).

6. The method of claim 1, wherein at least one of:
   when the first device does not have at least one of sidelink DRX configurations, sidelink DRX parameters, or sidelink DRX patterns for a third destination with available sidelink data, the first device is able to select or determine the third destination for utilizing the set of sidelink resources; or
   selecting or determining the first destination at least when one of:
      the first device does not have at least one of sidelink DRX configurations, sidelink DRX parameters, or sidelink DRX patterns for the first destination; or
      the initial sidelink resource of the set of sidelink resources is within sidelink active time associated with the first destination if the first device has at least one of sidelink DRX configurations, sidelink DRX parameters, or sidelink DRX patterns for the first destination.

7. The method of claim 1, wherein selecting or determining the first destination at least when the initial sidelink resource of the set of sidelink resources is within sidelink active time associated with the first destination and at least one of a MAC CE or a sidelink logical channel associated with the first destination is associated with highest priority.

8. A method of a first device to perform sidelink communication, comprising:
   determining a periodic sidelink resource reservation comprising a set of sidelink resources in a period;
   determining one or more sidelink logical channels with available sidelink data, wherein the one or more sidelink logical channels are associated with one or more destinations;
   selecting or determining, based upon at least one of sidelink Discontinuous Reception (DRX) configurations of the destinations, sidelink DRX parameters of the destinations, or sidelink DRX patterns of the destinations, a first destination from among the destinations at least when a most recent or first available sidelink resource of the set of sidelink resources is within sidelink active time associated with the first destination of the destinations;
   responsive to the selection or determination of the first destination, generating a first data packet for the first destination; and
   transmitting the first data packet on at least the most recent or first available sidelink resource of the set of sidelink resources to the first destination.

9. The method of claim 8, wherein at least one of:
   one sidelink resource of the set of sidelink resources, except the most recent or first available sidelink resource, is not in sidelink active time associated with the first destination,
   when the most recent or first available sidelink resource is not in sidelink active time associated with a second destination among the destinations, the first device excludes or prevents from selecting or determining the second destination for utilizing the set of sidelink resources, or when the most recent or first available sidelink resource is not in sidelink active time associated with the second destination and one sidelink resource of the set of sidelink resources, except the most recent or first available sidelink resource, is in sidelink active time associated with the second destination, the first device excludes or prevents from selecting or determining the second destination for utilizing the set of sidelink resources.

10. The method of claim 8, wherein at least one of:
the sidelink DRX configurations, sidelink DRX parameters or sidelink DRX patterns comprise at least one of a parameter of sidelink on-duration timer, a parameter of sidelink inactivity timer, a timing offset for sidelink on-duration, or sidelink DRX cycle, or the sidelink active time includes timing corresponding to a sidelink on-duration timer or sidelink inactivity timer running.

11. The method of claim 8, wherein the most recent or first available sidelink resource is the earliest sidelink resource, in time domain, among the set of sidelink resources when or after the first device is going to generate the first data packet or performs logical channel prioritization or selects or determines a destination.

12. The method of claim 8, wherein at least one of:
when the first device has the one or more sidelink logical channels with available sidelink data before a first timing of a first or initial sidelink resource among the set of sidelink resources, the first device generates the first data packet before the first timing of the first or initial sidelink resource, wherein the most recent or first available sidelink resource is the first or initial sidelink resource, or when the first device has no sidelink logical channels with available sidelink data before the first timing of the first or initial sidelink resource, and the first device has the one or more sidelink logical channels with available sidelink data before a second timing of a second sidelink resource among the set of sidelink resources, the first device generates the first data packet before the second timing of the second sidelink resource, wherein the most recent or first available sidelink resource is the second sidelink resource.

13. The method of claim 8, wherein at least one of:
the periodic sidelink resource reservation is provided, indicated, or derived based on a sidelink configured grant type 1, the periodic sidelink resource reservation is provided, indicated, or derived based on a sidelink configured grant type 2, or the periodic sidelink resource reservation is provided, indicated, or derived based on a selected sidelink grant corresponding to transmission(s) of multiple Medium Access Control (MAC) Protocol Data Units (PDUs).

14. The method of claim 8, wherein at least one of:
when the first device does not have at least one of sidelink DRX configurations, sidelink DRX parameters, or sidelink DRX patterns for a third destination, the first device is able to select or determine the third destination for utilizing the set of sidelink resources; or selecting or determining the first destination at least when one of:
the first device does not have at least one of sidelink DRX configurations, sidelink DRX parameters, or sidelink DRX patterns for the first destination; or the most recent or first available sidelink resource of the set of sidelink resources is within sidelink active time associated with the first destination if the first device has at least one of sidelink DRX configurations, sidelink DRX parameters, or sidelink DRX patterns for the first destination.

15. A method of a first device to perform sidelink communication, comprising:
determining a periodic sidelink resource reservation comprising a set of sidelink resources in a period;
determining one or more sidelink logical channels with available sidelink data, wherein the one or more sidelink logical channels are associated with destinations;
selecting or determining, based upon at least one of sidelink Discontinuous Reception (DRX) configurations of the destinations, sidelink DRX parameters of the destinations, or sidelink DRX patterns of the destinations, a first destination from among the destinations at least when a remaining or available sidelink resource of the set of sidelink resources is within sidelink active time associated with the first destination of the destinations;
responsive to the selection or determination of the first destination, generating a first data packet for the first destination; and
transmitting the first data packet on at least the remaining or available sidelink resource of the set of sidelink resources to the first destination.

16. The method of claim 15, wherein at least one of:
one sidelink resource of the set of sidelink resources is not in sidelink active time associated with the first destination, or when all of the set of sidelink resources are not in sidelink active time associated with a second destination among the one or more destinations, the first device excludes or prevents from selecting or determining the second destination for utilizing the set of sidelink resources.

17. The method of claim 15, wherein at least one of:
the sidelink DRX configurations, sidelink DRX parameters or sidelink DRX patterns comprise at least one of a parameter of sidelink on-duration timer, a parameter of sidelink inactivity timer, a timing offset for sidelink on-duration, or sidelink DRX cycle, or the sidelink active time includes timing corresponding to a sidelink on-duration timer or sidelink inactivity timer running.

18. The method of claim 15, wherein at least one of:
the first device generates the first data packet before a first timing of a first or initial sidelink resource among the set of sidelink resources, or wherein when the first device has no sidelink logical channels with available sidelink data before the first timing of the first or initial sidelink resource, and the first device has the one or more sidelink logical channels with available sidelink data before a second timing of a second sidelink resource among the set of sidelink resources, the first device generates the first data packet before the second timing of the second sidelink resource.

19. The method of claim 15, wherein at least one of:
the periodic sidelink resource reservation is provided, indicated, or derived based on a sidelink configured grant type 1, the periodic sidelink resource reservation is provided, indicated, or derived based on a sidelink configured grant type 2, or the periodic sidelink resource reservation is provided, indicated, or derived based on a selected sidelink grant corresponding to transmission(s) of multiple Medium Access Control (MAC) Protocol Data Units (PDUs).

20. The method of claim 15, wherein at least one of:

when the first device does not have at least one of sidelink DRX configurations, sidelink DRX parameters, or sidelink DRX patterns for a third destination, the first device is able to select or determine the third destination for utilizing the set of sidelink resources; or selecting or determining the first destination at least when one of:

the first device does not have at least one of sidelink DRX configurations, sidelink DRX parameters, or sidelink DRX patterns for the first destination, or the remaining or available sidelink resource of the set of sidelink resources is within sidelink active time associated with the first destination if the first device has at least one of sidelink DRX configurations, sidelink DRX parameters, or sidelink DRX patterns for the first destination.

* * * * *